(12) United States Patent
Lazarou

(10) Patent No.: US 12,516,885 B2
(45) Date of Patent: Jan. 6, 2026

(54) CARBON BAKING FURNACE

(71) Applicant: Lazar Anode Technologies AG, Brunnen (CH)

(72) Inventor: Rick Kiriakos Lazarou, Brunnen (CH)

(73) Assignee: Axaeon Enterprises AG, Schwarzenberg (CH)

( * ) Notice: Subject to any disclaimer, the term of this patent is extended or adjusted under 35 U.S.C. 154(b) by 1052 days.

(21) Appl. No.: 17/238,537

(22) Filed: Apr. 23, 2021

(65) Prior Publication Data

US 2021/0348848 A1 Nov. 11, 2021

Related U.S. Application Data

(63) Continuation of application No. 16/184,145, filed on Nov. 8, 2018, now abandoned, which is a continuation of application No. 14/436,182, filed as application No. PCT/IB2013/002317 on Oct. 16, 2013, now abandoned.

(60) Provisional application No. 61/714,634, filed on Oct. 16, 2012.

(51) Int. Cl.
| | |
|---|---|
| F27D 17/30 | (2025.01) |
| F27B 1/00 | (2006.01) |
| F27B 9/14 | (2006.01) |
| F27B 9/34 | (2006.01) |
| F27B 9/38 | (2006.01) |
| F27B 9/39 | (2006.01) |
| F27D 3/00 | (2006.01) |
| F27D 17/10 | (2025.01) |
| F27D 17/20 | (2025.01) |

(52) U.S. Cl.
CPC ............ *F27D 17/302* (2025.01); *F27B 1/005* (2013.01); *F27B 9/142* (2013.01); *F27B 9/34* (2013.01); *F27B 9/38* (2013.01); *F27B 9/39* (2013.01); *F27D 3/0033* (2013.01); *F27D 17/10* (2025.01); *F27D 17/20* (2025.01)

(58) Field of Classification Search
CPC .. F27B 1/005; F27B 9/142; F27B 9/34; F27B 9/38; F27B 9/39; F27D 3/0033; F27D 17/002; F27D 17/004; F27D 17/008
USPC .......................................................... 432/96
See application file for complete search history.

(56) References Cited

U.S. PATENT DOCUMENTS

| | | | | |
|---|---|---|---|---|
| 4,235,592 A | * | 11/1980 | Smith, Jr. ................ | B22F 3/15 219/400 |
| 4,995,807 A | * | 2/1991 | Rampley .................. | F23C 9/00 431/9 |
| 7,086,856 B1 | * | 8/2006 | Lazarou ................... | H05B 7/09 432/192 |
| 2001/0046649 A1 | * | 11/2001 | Schutz .................... | F23D 14/64 431/12 |

* cited by examiner

*Primary Examiner* — Steven B McAllister
*Assistant Examiner* — Benjamin W Johnson
(74) *Attorney, Agent, or Firm* — Fred Zollinger

(57) ABSTRACT

A carbon baking furnace has at least one vertical baking shaft with a system and method for positioning green carbon bodies to be baked at the top of the vertical baking path and ringing the green carbon bodies with a sacrificial medium such as packing coke. The disclosure provides a system and method for controlling the delivery and removal of the sacrificial medium used to surround the carbon bodies within the baking paths. A volatile extraction system and method are provided. A system and method for unloading baked carbon bodies is disclosed.

12 Claims, 31 Drawing Sheets

CARBON BAKING FURNACE

CROSS REFERENCE TO RELATED APPLICATIONS

This application is a continuation application claiming priority to U.S. patent application Ser. No. 16/184,145 filed Nov. 8, 2018, which is a continuation application claiming priority to U.S. patent application Ser. No. 14/436,182 filed Apr. 16, 2015, which is a United States National Stage patent application filed under 35 U.S.C. § 371 claiming priority to PCT/IB2013/002317 having an international filing date of Oct. 16, 2013, which application claims the benefit of U.S. Provisional Patent Application 61/714,634 filed Oct. 16, 2012.

BACKGROUND OF THE DISCLOSURE

1. Technical Field

The present disclosure generally relates to carbon baking furnaces and, more particularly, to carbon baking furnaces having vertically-disposed baking paths. In one configuration, the invention relates to a furnace having at least one, but typically an array of vertically-disposed baking paths used to bake a carbon body that travels down through the baking paths while packed in a sacrificial medium.

2. Background Information

Various operations require green carbon to be baked prior to use. Some of these operations use granulated green carbon while others use blocks of green carbon. One such baking operation is the manufacture of anodes that are later used to make aluminum. The conversion of alumina to aluminum metal by electrolysis results in the substantial consumption of carbon anodes. Molten aluminum is deposited onto a carbon cathode and simultaneously oxygen is deposited on and consumes the carbon anode of the electrolytic cell. Typically, up to 0.4 tonnes of carbon are consumed for every tonne of aluminum produced. As a result, aluminum smelters have a requirement for a substantial and continuous supply of carbon anodes. Smelters commonly manufacture carbon anodes on site as an integral part of the aluminum production process.

The manufacture of carbon anodes for the aluminum manufacturing process includes producing "green" anode blocks and baking the "green" blocks to produce anodes suitable for use in the aluminum manufacturing process. The production of "green" blocks involves the mixing of crushed coke or anthracite with a binding agent which, for example, contains coal tar pitch. The viscous mixture is then pressed to form "green" anode blocks. Depending on the smelter's requirements, "green" anodes may typically weigh from a few hundred kilograms to more than a tonne. The mixture of coke and pitch binder is generally solid at room temperature and softens at temperatures over about 50 degrees C. Volatile components are released at temperatures between 50 degrees C. and 400 degrees C. When subjected to further heating over a period of time, to about 1200 degrees C., the anode hardens, resulting in improved physical properties, such as electrical conductivity and resistance to oxidation.

A carbon anode baking furnace having a substantially vertical baking path is disclosed in WO 99/06779. Green anodes are packed in sacrificial media within the vertical baking path and moved downwardly through a baking zone. The baked anodes are removed from the bottom of the baking path along with a portion of the sacrificial medium that surrounds the anodes. The movement of the sacrificial medium within the baking path must be controlled such that the removal of the bottom anode does not upset the packing of the sacrificial medium about an anode disposed higher up the baking path. The loading and unloading of the sacrificial medium is an issue desirous of improvement.

Another issue with the vertical-path furnace such as that disclosed in WO 99/06779 is the removal of the baked anodes at the bottom of the furnace. The anodes are disposed in a self-supporting column while in the baking path. The problem of removing the lowermost baked anode while not upsetting the column is an issue desirous of improvement.

The removal and treatment of pitch fumes or volatiles is an issue desirous of improvement.

SUMMARY OF THE DISCLOSURE

The disclosure provides a carbon baking furnace having at least one vertical baking shaft with a system and method for positioning green carbon bodies to be baked at the tops of the vertical baking paths and ringing the green carbon bodies with a sacrificial medium such as packing coke.

The disclosure provides a carbon baking furnace having at least one vertical baking shaft with a system and method for controlling the sacrificial medium used to surround the carbon bodies within the baking paths. The system and method includes elements disposed at the top of the furnace where the sacrificial medium is loaded and elements disposed at the bottom of the furnace where the sacrificial medium is unloaded.

The disclosure provides a carbon baking furnace having a system and method for unloading baked carbon bodies at the bottom of an array of baking paths while supporting the column of carbon bodies remaining in the baking path.

The disclosure provides a volatile extraction system that extracts volatile fumes from the upper portion of the furnace and introduces the volatile fumes to the burners in the baking portion of the furnace. This system allows the volatile fumes to be selectively directed to an afterburner and automatically delivered to the afterburner during an emergency.

The disclosure provides volatile extraction channels that are independent of the baking fume channels and are sandwiched between portions of the baking fume channels.

The disclosure provides volatile extraction inlets that are sloped upwardly from the baking paths.

The disclosure provides a sacrificial medium delivery system having channels to deliver medium to the baking path.

The disclosure provides grab assemblies that pinch and hold the second lowermost article to allow the lowermost article to be removed from the furnace.

The disclosure provides methods of using associated with each of the systems of the furnace.

The disclosure will now be further described with reference to the accompanying drawings. In the drawings the carbon articles are represented by anodes for use in the aluminum smelting industry. It will be understood that the features of the present invention applies equally to the baking of other carbon articles provided in block or granular form.

The plurality of individual furnace features and method steps described in this disclosure may be combined with one another to form additional unique combinations.

BRIEF DESCRIPTION OF THE DRAWINGS

FIG. 3 also shows the system for loading sacrificial medium into the baking paths around the anodes.

Similar numbers refer to similar parts throughout the specification.

DETAILED DESCRIPTION OF THE DISCLOSURE

Figure 1:
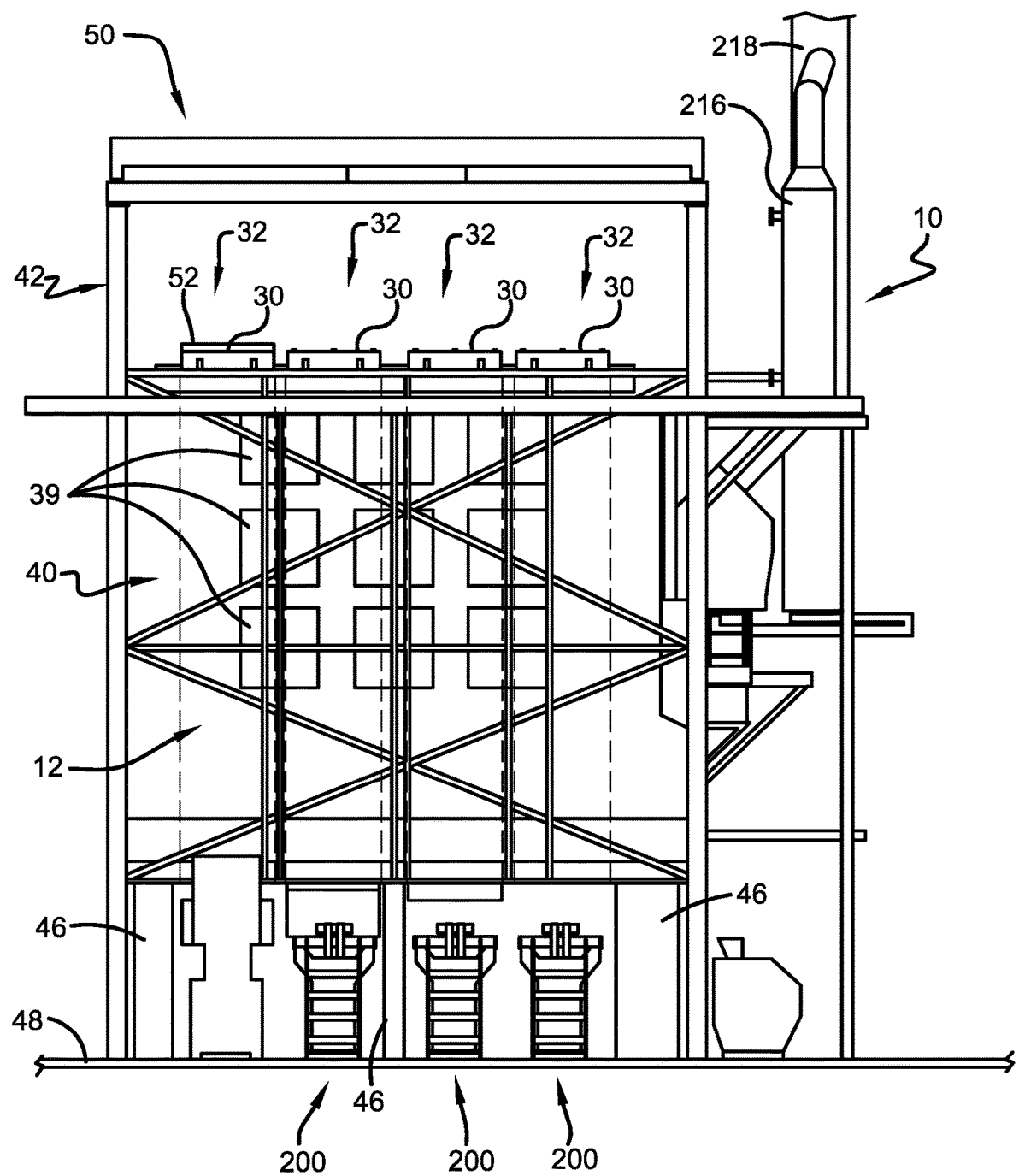
FIG. 1 is a front view of an exemplary configuration of a vertical-path carbon baking furnace having a plurality of baking paths arranged in an array.
Figure 2:
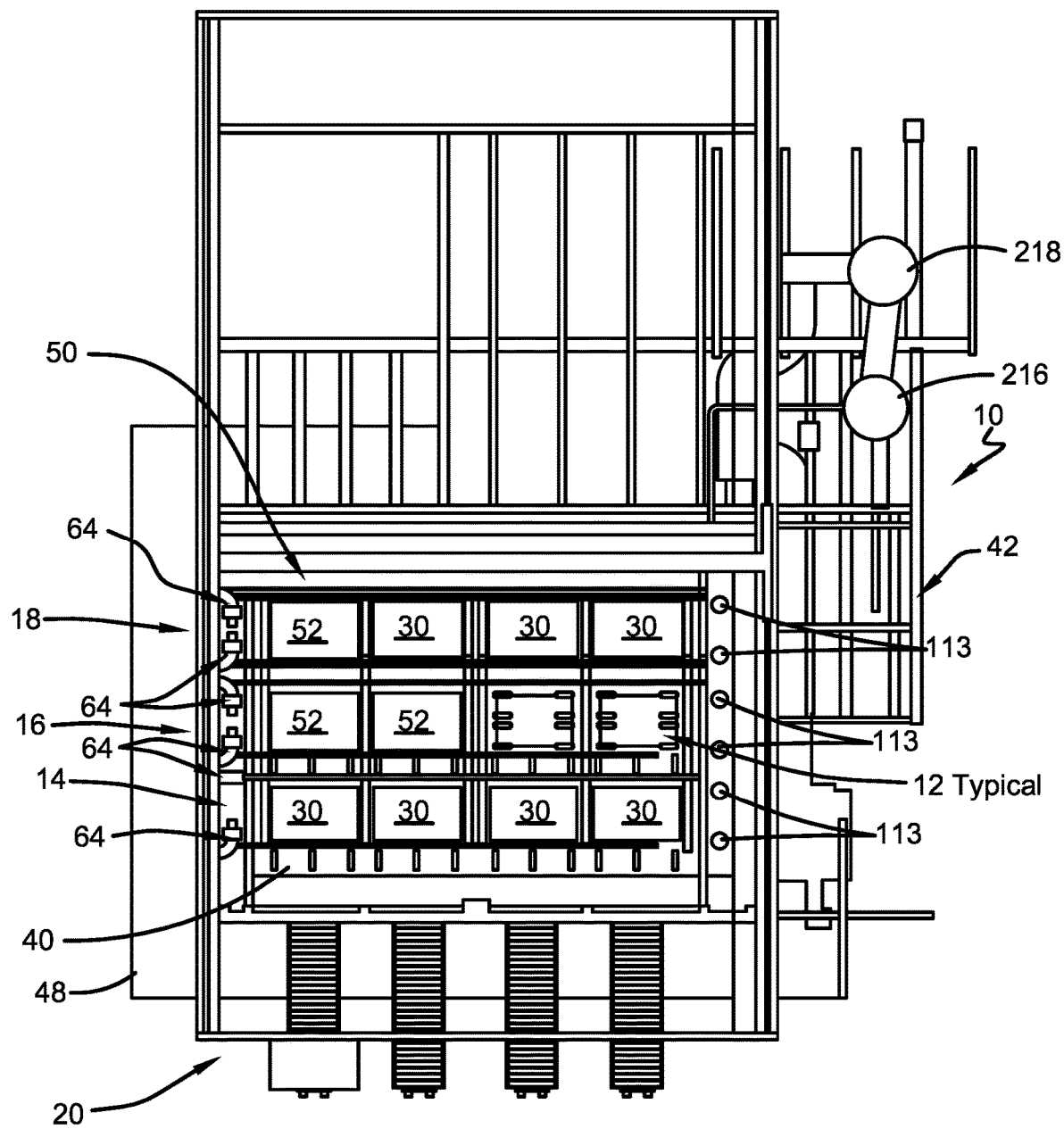
FIG. 2 is a top view of the exemplary furnace configuration of FIG. 1.
Figure 3:
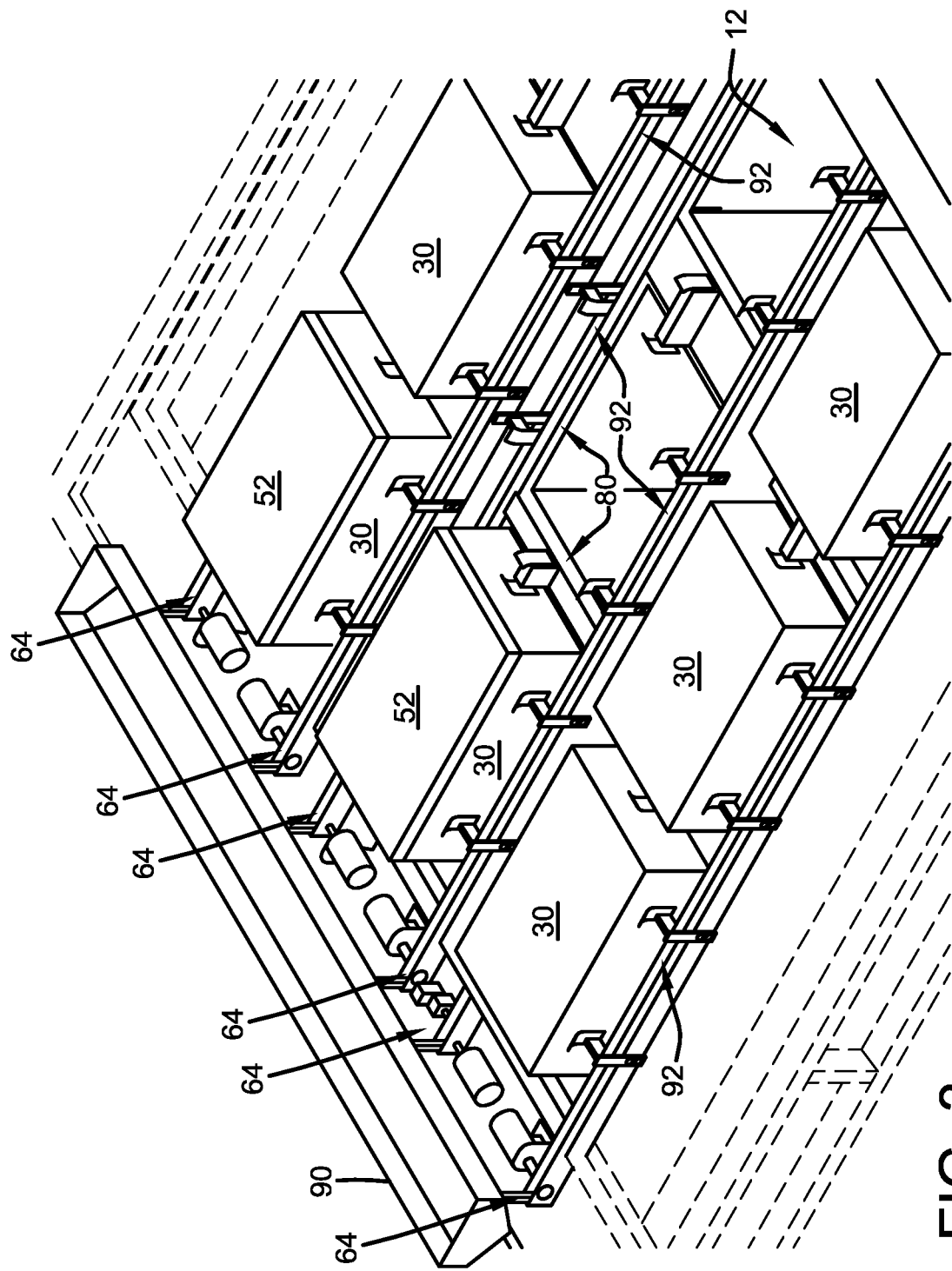
FIG. 3 is a perspective view of the top of the furnace showing six anodes positioned at their uppermost position with two baking paths empty for purposes of showing the structures around the top of the baking path.

An exemplary configuration of a vertical-path baking furnace is identified by reference numeral 10 in the following description. FIG. 1 depicts a front view of furnace 10 while FIG. 2 depicts a top view of furnace 10 showing the location of a plurality of carbon body baking paths 12 arranged in a three-by-four array with three baking path rows and four baking path columns. The array of baking paths 12 thus includes a plurality (in this example ten) of perimeter baking paths that are not entirely surrounded by other baking paths and, in this example, a plurality (two) of captured baking paths 12 that are entirely surrounded (when viewed from the top) by other baking paths 12. The array of baking paths includes a front row 14 of baking paths 12, a middle row 16, and a back row 18. In other array configurations, there will be a different number of middle rows 16 to increase the production capacity. In this configuration, the front row is the closest to the unloading direction at the bottom of furnace 10. In FIG. 2, the baked carbon bodies are unloaded from the bottom of the baking paths 12 in the direction that faces the bottom of the drawing page which corresponds to the direction toward the viewer in FIG. 1 (this is the front 20 of furnace 10). The baking paths 12 are generally rectangular and are larger than but generally the same shape as the carbon body that is to be passed through the baking path 12. In other configurations, the shape of the baking path 12 may differ from the shape of the carbon body. The size of the baking paths 12 allow the carbon bodies to be surrounded by a sacrificial medium such as granular packing coke. The sacrificial medium may be any medium which will protect the carbon bodies during the baking process. The sacrificial medium may preferentially react with or absorb the oxygen in the furnace prior to its reaction with the carbon in the articles being baked. It is preferred that the sacrificial medium be friable to permit it easy incorporation around the carbon articles and to permit the easy movement of the carbon articles within the kiln. The sacrificial medium may be selected to provide an optimum balance of rendering the carbon articles easily moveable through the furnace and providing sufficient protection of the carbon articles from oxygen contained within the kiln. In one configuration, the sacrificial medium has a maximum particle size of less than fifteen millimeters.

Green carbon bodies 30 are loaded into baking paths 12 at the top of furnace 10 and unloaded at the bottom of furnace 10 where the baked carbon bodies 30 are unloaded from a bottom of a baking path 12. The unloading process controls the downward movement of the carbon bodies 30 through furnace 10 during the baking process such that each vertical column 32 of carbon bodies 30 is supported from the bottom. Carbon bodies 30 move through furnace 10 in a substantially continuous manner and the time for a single carbon body 30 to move through baking path 12 is many hours. It will be understood that the term "substantially continuously" refers to a continuous mode of operation whereby carbon bodies 30 are moved in either a uniform rate or a periodic or step-wise passage through furnace 10. Carbon bodies 30 are moved "substantially continuously" through the baking process without the need for furnace 10 to be shut down and cooled as in prior art in-ground anode baking furnaces. The substantially continuous movement includes the periodic stopping of the downward movement of column 32 that is required to unload the lowermost baked carbon body 30 from baking path 12.

The following exemplary configuration of furnace 10 is described as an anode baking furnace. Other carbon articles may be baked in this type of furnace and the inventions described herein are not to be limited to anodes used for aluminum production. Furnace 10 may be used with other block-like carbon articles or loose granular carbon articles.

The exemplary carbon baking furnace 10 shown in FIGS. 1 and 2 defines a plurality (twelve in this example) of vertical baking paths 12. Paths 12 are defined by a refractory furnace body 40 that is defined by a plurality of interlocking refractory bricks and other refractory materials that are partially supported by an external support frame 42 that is disposed below and around refractory furnace body 40. Furnace 10 is designed to operate at a steady state so interlocking bricks may be used because the bricks are not repeatedly subjected to heating and cooling cycles. Refractory mortar can be used to hold the bricks together. Refractory furnace body 40 defines baking paths 12, a plurality of fume channels 34 for hot baking gas flow and cooling air flow 36 and a plurality of volatile fume extraction channels 33 for removing volatiles from furnace 10 upon the initial heating of green anodes 30. The furnace body 40 defines different heating zones including, from top to bottom, a volatile extraction zone, a baking zone, and a cooling zone. The zones are defined by the serpentine fume channels which run substantially perpendicular to and between the baking paths and move upwardly from lower areas of the furnace body to higher levels of the furnace body.

Figure 30:
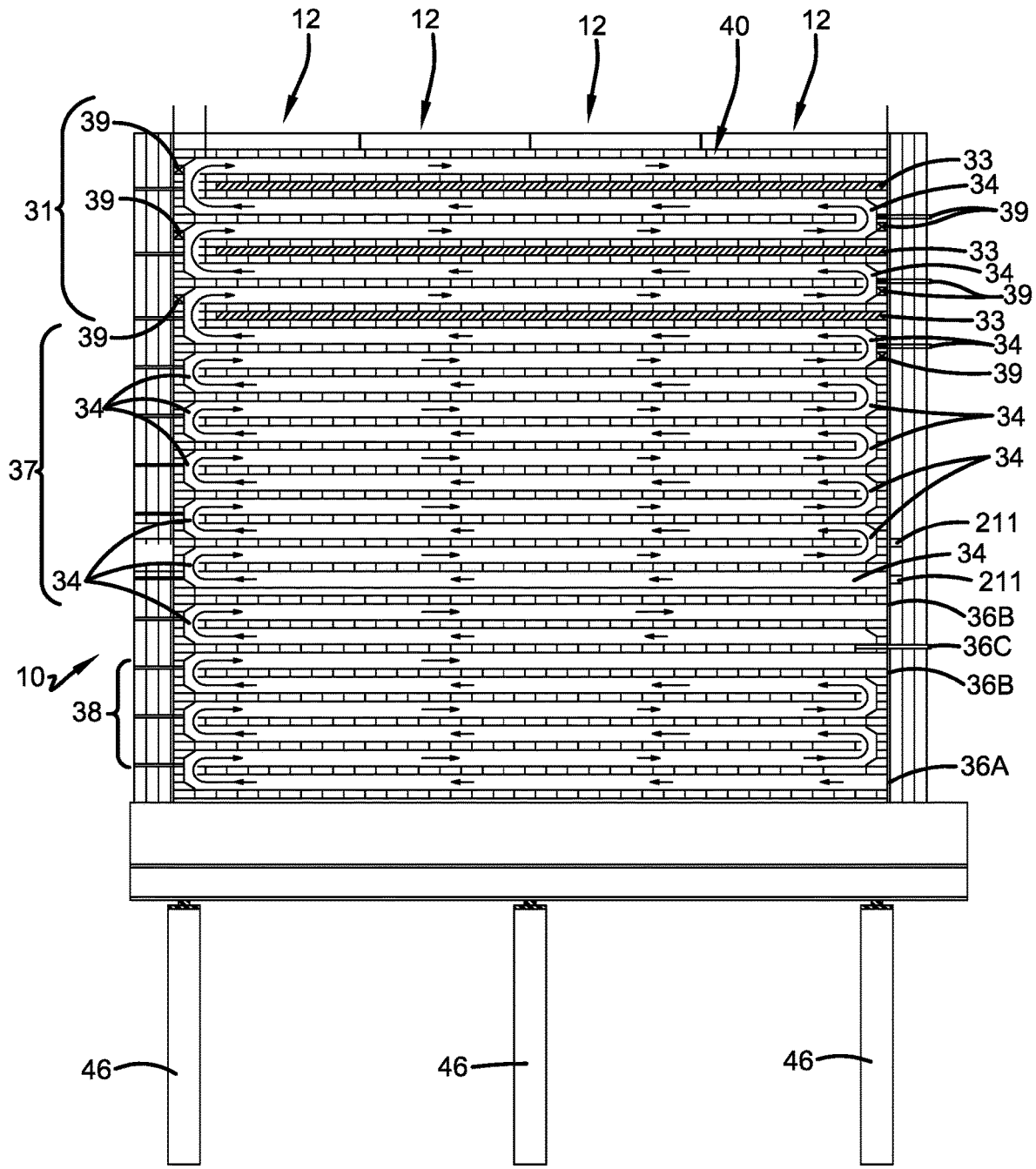
FIG. 30 is a side view of the furnace body showing the gas flow channels.
Figure 31:
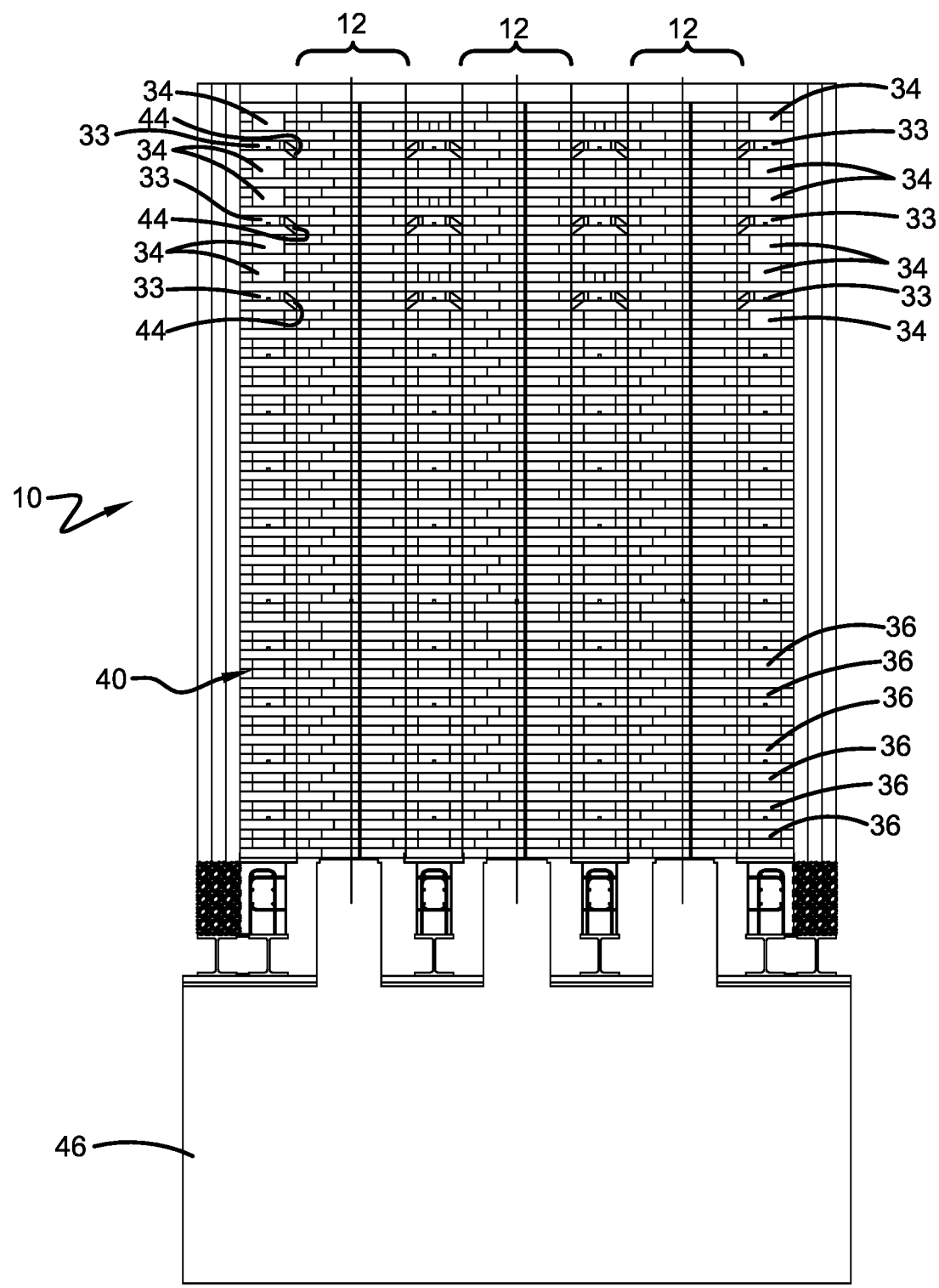
FIG. 31 is a section view taken through FIG. 30 at the location a set of volatile extraction inlets.
Figure 32:
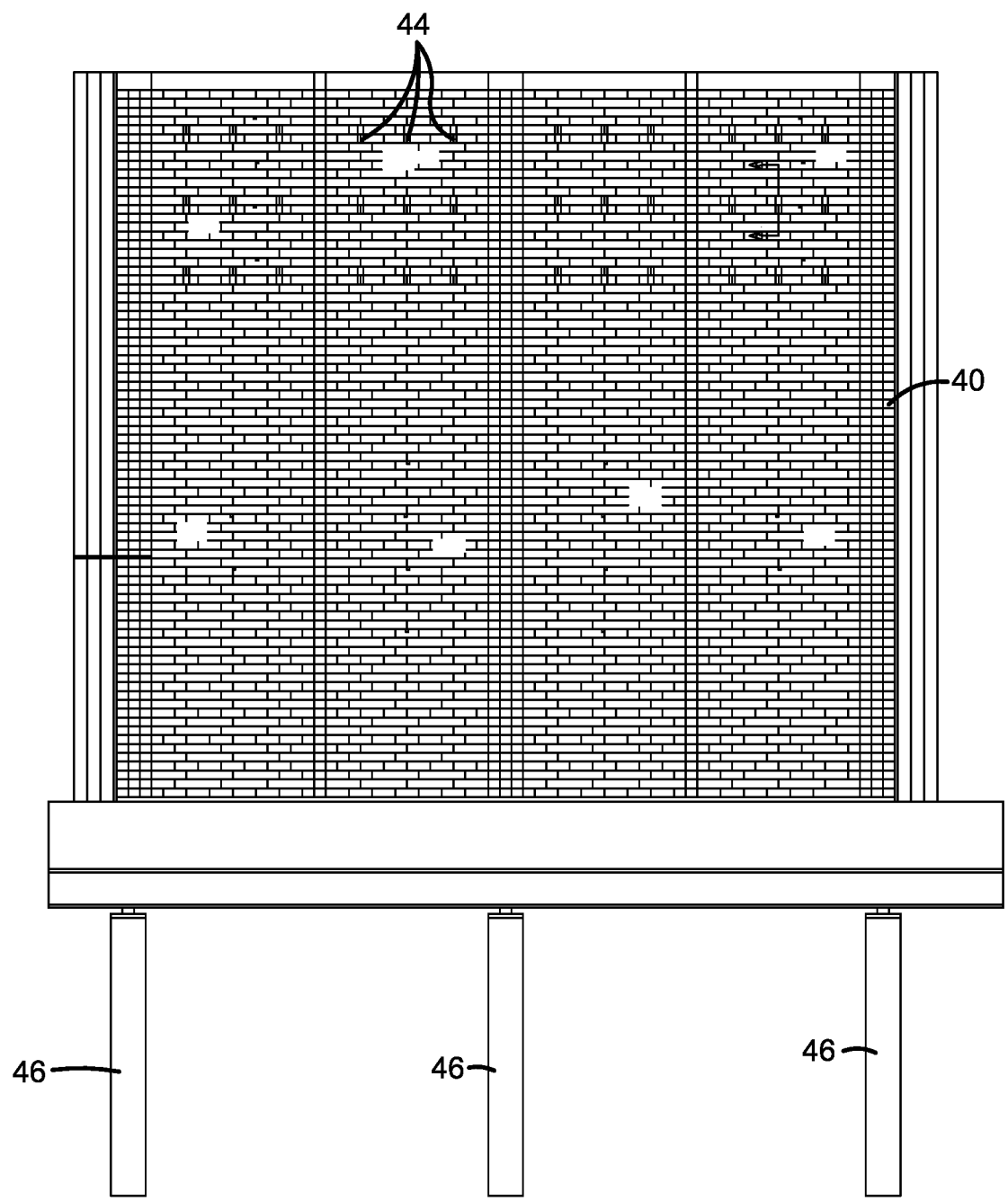
FIG. 32 is a section view taken through the baking paths showing the arrangement of the volatile extraction inlets.

As the carbon anodes 30 pass through furnace 10, they are loaded at a loading zone at the top of furnace 10 and then pass down through a volatile extraction zone (reference numeral 31 FIG. 30) which is heated in a general range from about 50 degrees C. to 400 degrees C. Volatiles such as pitch fumes are extracted through holes or volatile extraction inlets 44 in the refractory materials 40 and are moved in the manner described below. Furnace body 40 defines independent volatile extraction channels 33 (shown as solid black lines in FIG. 30) that are sandwiched between the serpentine baking fume channels 34. Maintaining independent volatile extraction channels 33 allows the extraction of volatiles to be controlled and allows the extracted volatile fumes to be selectively incinerated. Anodes 30 then pass through a baking or kiln area 37 (FIG. 30) where the anodes baked at high temperatures (such as 1200 degrees C.) and then through a cooling zone 38 (FIG. 30) before reaching an unloading zone. Air is drawn into cooling zone 38 through an entrance 36A and exhausted at exits 36B. This air may be redirected to be used with burners 211. Reference numeral 36C is a damper. Reference numeral 39 in FIG. 30 represents locations where removable plugs or dampers are provided for adding or removing air so that the flue walls can be selectively reconfigured.

Green anodes 30 are positioned at the top of baking paths 12 with a delivery device 50 which may be in the form of the crane 50 depicted in the drawings. Crane 50 supports anode 30 from its center (at depressions defined by the top of the anode) so that each anode 30 may be lowered into baking path 12 without requiring supports disposed at the sides or under article 30. If desired, this configuration allows crane 50 to load anode 30 all the way to the bottom of baking path 12 when furnace 10 is initially loaded. Anodes 30 also may be loaded from the bottom of each column. This configuration allows crane 50 to reach into baking path 12 to remove anode 30 as needed. A spacer 52 may be positioned on top of each anode 30. Spacer 52 may be fabricated from a refractory material such as a ceramic. A super duty fireclay brick material may be used for the spacers 52 with a density of about (within a range of 5%) 2.27 grams per cubic centimeter. The material sold under the registered trademark CLIPPER DP is an exemplary material that may be used to form spacers 52. Spacer 52 may be provided in multiple sections that fit together on top of anode 30. The sections may overlap and have stepped edges or stepped joints to help spacer 52 fit together. Spacer 52 may include protrusions to fill the openings on top of the anodes.

Figure 5A:
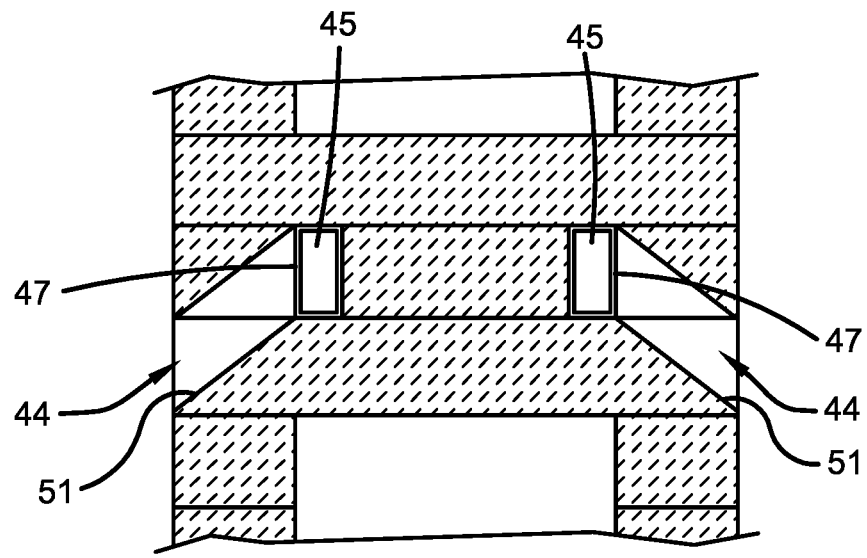
FIG. 5A is a section view through the furnace wall at the volatile extraction opening.

In the volatile extraction zone, the fume extraction channels have inlets 44 defined by the furnace walls that define baking paths 12. In the exemplary configuration, each baking path 12 has nine inlets 44 on each of its longer sides for a total of eighteen inlets 44. The eighteen inlets 44 are disposed in sets of six at three different levels. Other numbers of inlets and arrangements may be used. For example, the inlets may be disposed on more or fewer levels and different numbers of inlets may be used on each level. Each inlet 44 is an opening defined between portions of the refractory bricks as shown in FIG. 5A. Using defined inlets 44 provides large openings that limit the available surfaces for the accumulation of condensed pitch fumes.

Figure 33:
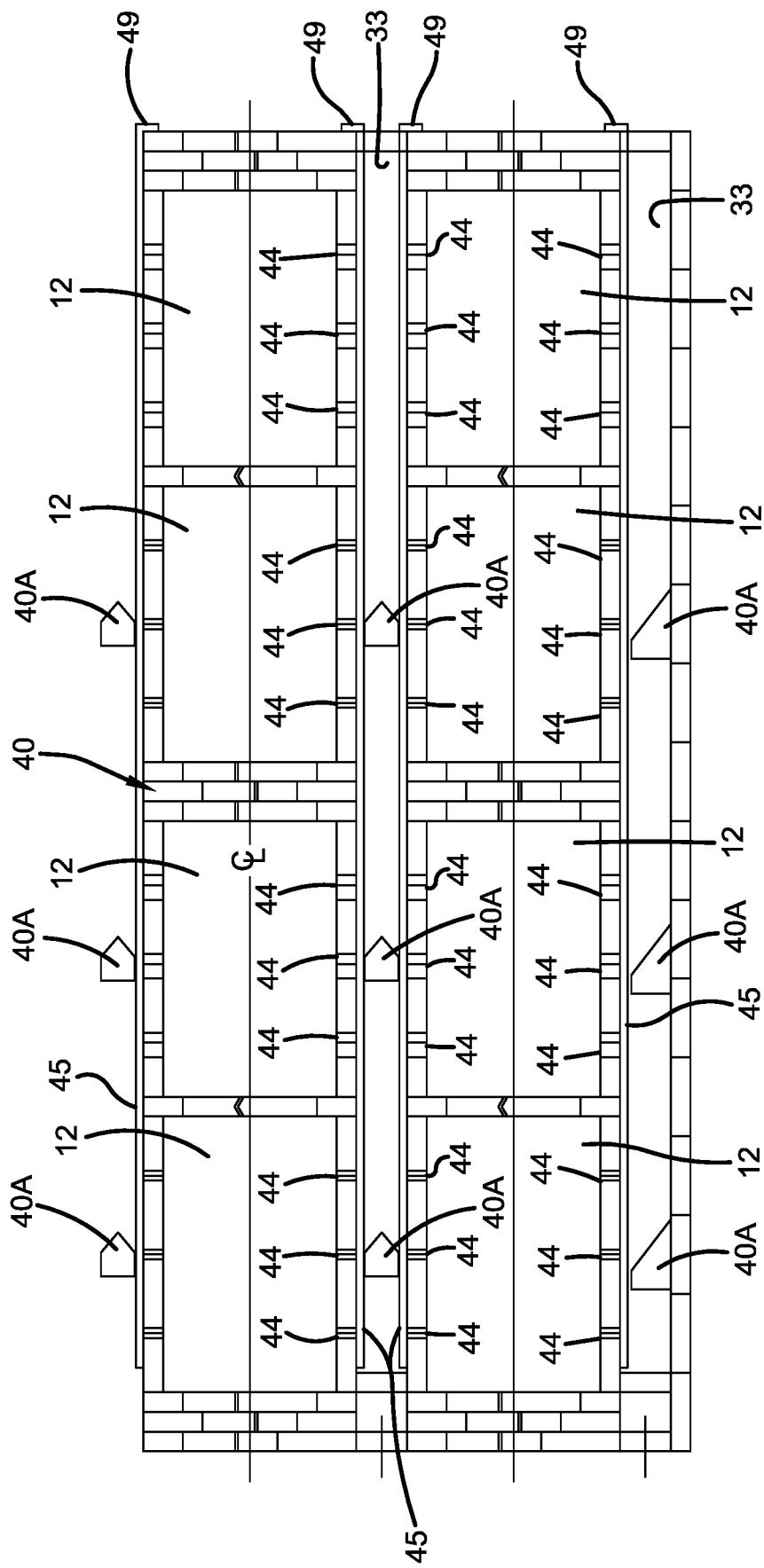
FIG. 33 is a section view through the furnace body showing the liners used with the volatile extraction inlets.

Inlets 44 provide fluid communication between baking paths 12 and elongated volatile extraction channels 33 that are in fluid communication with a source of reduced pressure (this may be the fan that moves gases through the entire furnace or a separate fan) that pulls fumes and volatiles out of the baking paths 12. An alternative configuration connects inlets 44 to the top channels 34 so the volatiles are mixes with the exhaust gases and delivered to an afterburner. These volatile fume channels 33 may be lined with a removable liner 45 (such as the one shown in FIG. 5B and FIG. 33) that defines a common channel for removing volatiles from a plurality of inlets 44 with which it is associated. Liner 45 defines a plurality of inlet slits 47 that are aligned with inlets 44 when liner 45 is installed. Liner 45 also includes an end flange 49 that abuts the exterior of the blocks. Liner 45 is removable so that it may be cleaned or replaced. Alternatively, liner 45 can be fixed in place and then cleaned in place by inserting and removing a scrubbing tool. Furnace body 40 defines guides 40A (FIG. 33) that help locate liners 45 as they are installed within volatile extraction channels 33. Guides 40A have angled leading ends to direct liner 45 toward the sidewall of channel 33.

Alternatively, the removable liner 45 or the volatile fume channels defined by the refractory bricks may be segmented so that each inlet 44 is in communication with an independently defined and independently valved (reference numeral 41 indicates controllable valves) extraction channel 43 that allows the flow rate for each inlet 44 to be independently controlled. A schematic of this configuration is shown in FIG. 5C. This configuration allows the flow rate for each inlet 44 to be substantially the same regardless of the distance of inlet 44 from header 210. This also allows sensors (pressure, temperature, flow rate, and/or chemical sensors) to be used to control flow rate for inlets 44 based on real time conditions. For example, a higher flow rate may be applied to inlets 44 that are experiencing higher levels of volatiles. In another configuration, liner 45 may be segmented to provide the plurality of inlets associated with a single baking path 12 with their own channel 43.

Inlets 44 are shown in FIG. 5A. Each inlet 44 is substantially larger than the average size of the sacrificial medium so that pieces of sacrificial medium will not become wedged in inlets 44. The width and height of inlets are larger than the width of outlets 102 and may be at least twice the average particle size of medium and may be more than five times the average particle size. Inlets 44 can be the entire height of one brick course as shown in FIG. 5A with the bottom wall of inlet 44 being defined by an upwardly sloping surface 51 with its lowest end nearest the baking path 12 and highest end nearest the volatile fume channel. Surface 51 is defined by an angled lateral portion of refractory brick disposed under inlet 44. The upper wall of inlet 44 is defined by another brick disposed one or two courses above inlet 44. The upper wall may be parallel to the bottom wall but does not need to be parallel to allow inlet 44 to function. The upper wall can slope down so that the top of inlet 44 at baking path 12 is disposed below the top of the fume channel or liner 45. This arrangement limits the accumulation of sacrificial medium particles in inlet 44. The sloped configuration of inlet 44 allows sacrificial medium that enters inlet 44 to move out as the sacrificial medium in baking path 12 moves down. The sloped bottom surface prevents particles of sacrificial medium from sitting in inlet 44 for long periods of time where they can stick and eventually require removal by scraping. The sloped inlets 44 are believed to be self-cleaning because the particles of sacrificial medium entering inlet 44 move out when the sacrificial medium within baking path 12 moves down past inlet 44. The sloped inlets 44 also prevent the sacrificial medium from moving up into the volatile fume extraction channels. The sloped inlets 44 and the extraction liner 45 can be used with a variety of furnaces independent of anode furnaces although the initial heating of anodes for the aluminum industry is known to create pitch fumes.

Figure 5B:
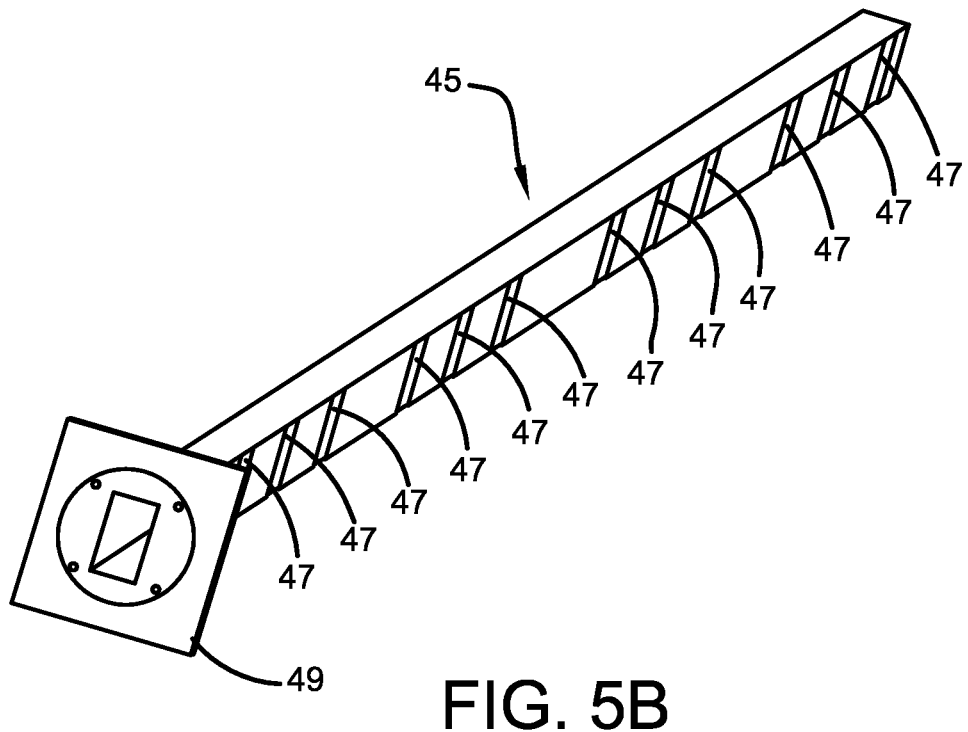
FIG. 5B is a perspective view of one configuration of a liner for a volatile fume extraction channel.
Figure 5C:
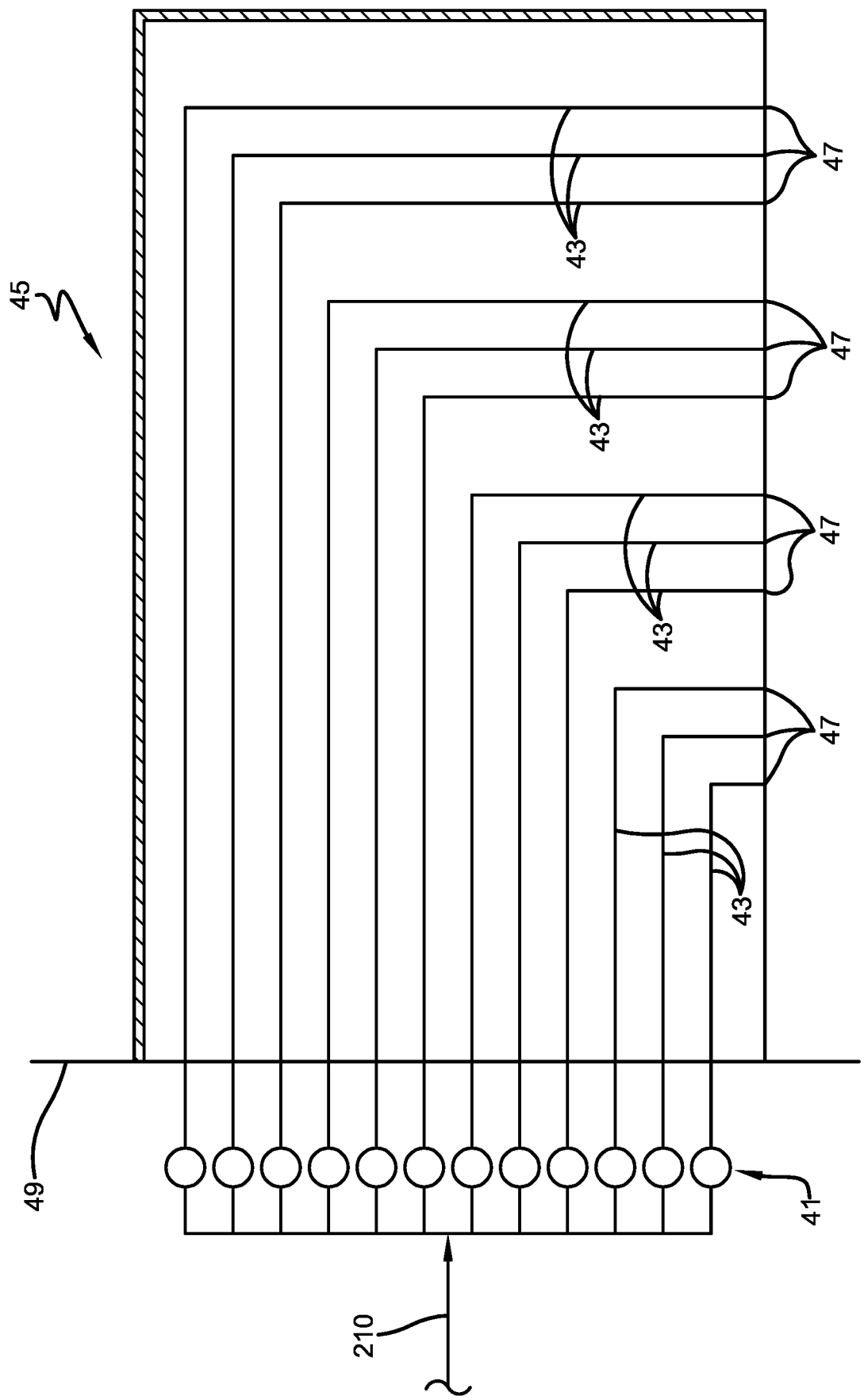
FIG. 5C is a schematic view of a segmented volatile extraction channel controlled with individual valves.
Figure 11:
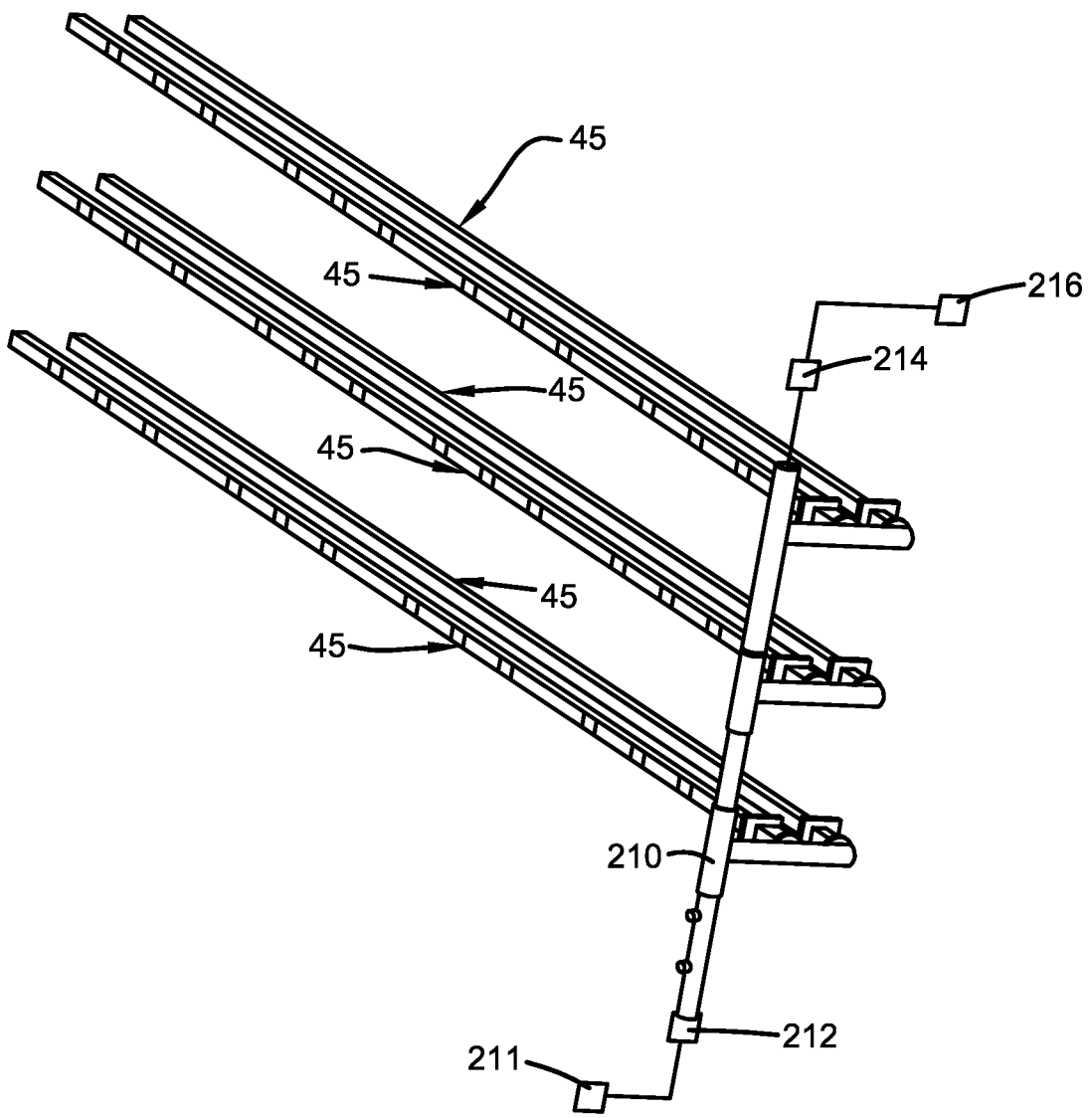
FIG. 11 is a perspective view of six volatile extraction channels shown without the refractory brick and the selectively configurable connections between these channels and the burners and afterburner.
Figure 12:
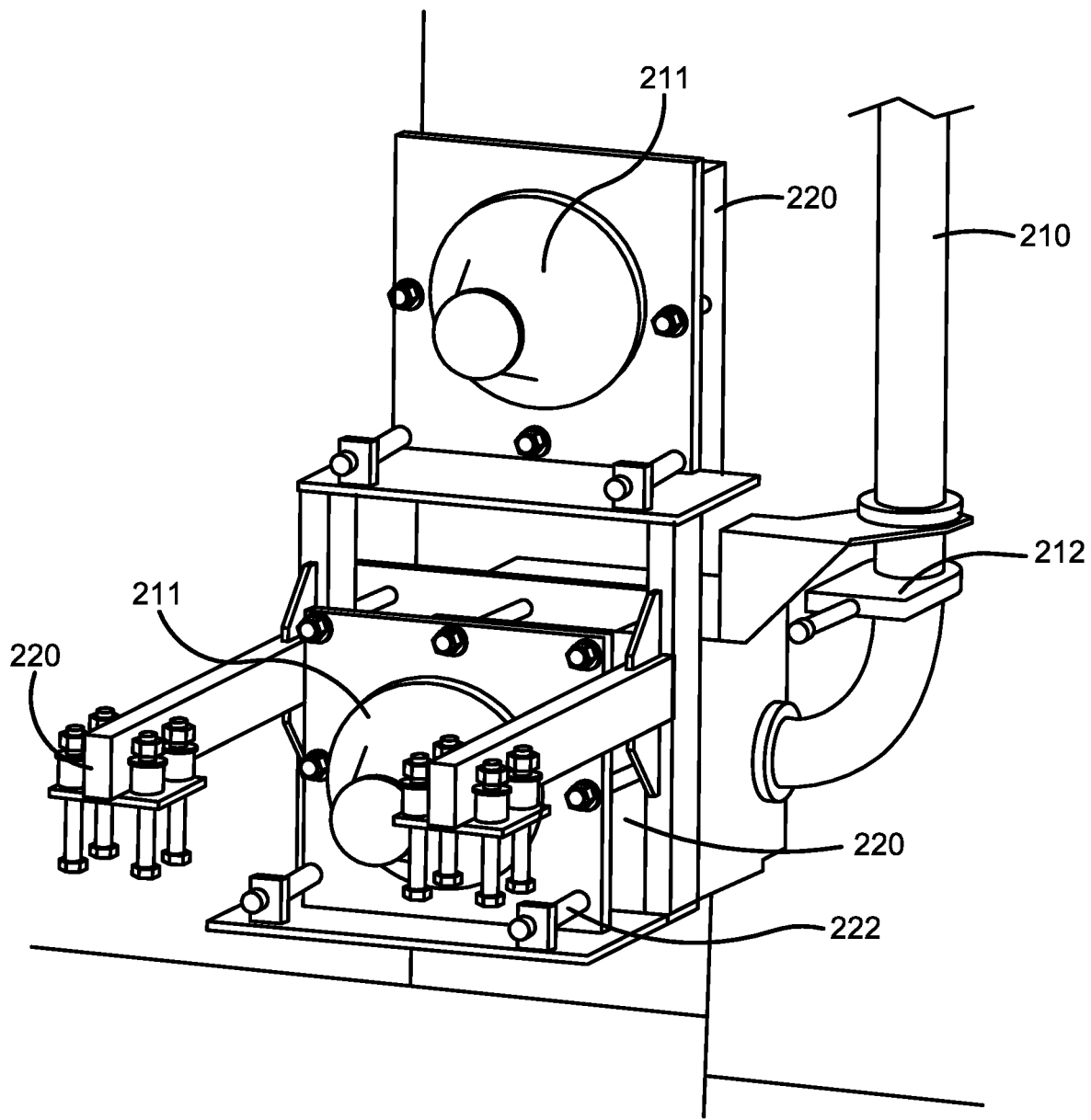
FIG. 12 is a perspective view of the side of the furnace showing the main furnace burners and the pipes used to deliver the volatile fumes.

As described above, furnace 10 has a volatile extraction zone where anodes 30 are initially heated and volatiles are driven off into extraction channels 45 such as those shown in FIGS. 5A, 5B, and 5C. FIG. 11 shows the arrangement of six liners 45 and their communication with a volatile extraction header 210. These six liners 45 are used with seventy-two inlets 44 on the sidewalls of baking paths 12. The arrangement depicted in FIG. 11 is used between rows of baking paths 12. Similar arrangements with only three liners 45 are used on the front and rear ends of furnace 10. The vertical spacing between channels 45 depends on the furnace size and the item being baked in the furnace. Header 210 delivers volatiles to the burners 211 as shown in FIG. 12 when a first valve 212 is open and a second valve 214 (at the top of duct 210) is closed. Valves 212 and 214 are remotely controllable to deliver the volatile fumes to either burner 211 or to an afterburner 216 (FIG. 1) or a combination of both. Each valve 212 and 214 may be a gate-style valve and each has its own actuator to allow the valve to be automatically and remotely controlled. When first valve 212 is closed and second valve 214 is open, volatile fume is delivered to afterburner 216 and this configuration is automatically actuated during an emergency situation or when burners 211 are off. Afterburner 216 exhausts to a stack 218 for delivery to the atmosphere or to further environmental controls. Delivering the extracted volatile fumes to burners 211 reduces the volatiles that must be burned in an afterburner or delivered to a cleaning apparatus before the fumes are exhausted to the atmosphere. Burning the volatile fumes with burners 211 in combination with the fuel for burners 211 (usually natural gas) requires a high quality pressed and fired refractory brick to be used at the main baking zones of furnace 10 because the bricks must be resistant to the products of burned volatiles such as alkali. When the volatiles are being introduced to burners 211, furnace 10 is acting as a self-contained incinerator in addition to a carbon baking furnace.

Burners 211 and the air delivery ducts are mounted to accommodate expansion and contraction of the refractory bricks of furnace 10. FIG. 12 shows each burner 211 mounted to a plenum 220 that accommodates movement of the refractory bricks. A plurality of springs 222 are used between the components and frame 42 to create a holding force against the bricks while allowing for accommodation of brick movement. The air delivery system uses similar springs and adjustable plenums to accommodate movement.

Frame 42 includes a plurality of lower supports 46 that support refractory body 40 above the floor 48 on which furnace 10 is supported. Lower supports 46 may be concrete pillars. Lower supports 46 provide space for the unloading of the baked anodes 30. Steel beams may be disposed on supports 46 with body 40 supported on the beams. A thin layer of refractory material such as a ceramic fiber may be disposed between body 40 and the beams to accommodate expansion and contraction of body 40. An example material is Express-27 Plus. Frame 42 also supports a plurality of pressure plates 39 that may be moved toward and away from body 40. For example, furnace body 40 may be heated to its steady state temperature and then plates 39 may be moved against the outer surface to provide some lateral support to body 40. As depicted in FIG. 1, plates 39 are disposed between baking paths 12. Plates 12 also may be disposed at the corners of body 40. The plates 39 spread the holding force across a plurality of refractory bricks.

After a column is initially loaded and furnace 10 is fired and has reached steady state, the anode column is slowly lowered in a substantially continuous manner to bake the anodes. As the column is lowered, a new green anode 30 is placed at the top of the column. The initial placement of anode 30 is such that anode 30 is disposed intermediate guides 60 (FIG. 4) of which at least one is disposed on each side of the top of baking path 12 such that anode 30 is centered above path 12. The exemplary configuration of guides 60 shown in the drawings are substantially fixed guide plates. In another configuration, each guide 60 is provided in the form of a roller or a plurality of rollers. The initial location places the majority of the height of anode 30 above the top of baking path 12. As column 32 of anodes 30 is lowered through path 12, sacrificial medium such as granular packing coke is positioned around anode 30 by a sacrificial medium delivery system 64.

In the exemplary configuration of furnace 10, anodes 30 are loaded into the tops of the baking paths 12 with overhead crane 50 that lowers anode 30 directly into the baking path 12. Crane 50 is capable of lowering anode 30 all the way to the bottom of each baking path 12 which is one method of initially loading furnace 10. Furnace 10 is initially loaded by creating columns 32 of anodes 30 surrounded by the packing material. The anode columns also may be created working from the bottom of furnace by pushing successive greens anodes 30 and spacers 52 up into the baking paths 12. FIG. 2 depicts ten of the columns loaded (three with spacers 52 on top of the anode column 32) and two empty baking paths 12 waiting to be filled. After columns 32 of anodes 30 are established in each baking path 12, furnace 10 is started and brought up to its steady state operating condition and the anode columns 32 are lowered as described below. When a column 32 is lowered to a level where the column 32 can accept the next anode 30, crane 50 is directed to pick up the next green anode 30 and deliver it directly on top of that column 32. Once anode 30 is in position and crane 50 releases anode 30, the recesses in the top of anode 30 that are used by crane 50 to grip and move anode 30 are filled with the packing material and then spacer 52 is placed on top of anode 30. Spacers 52 may be positioned with crane 50 or an independent second swinging crane (not shown) during the process of positioning them for placement.

Furnace 10 may include sensors that indicate the position of the top of the anode columns. The position of the anode column also may be monitored by the removal of the lower baked anodes. Crane 50 may communicate with these sensors to trigger the pickup and delivery of the next anode to be loaded.

In this configuration, crane 50 lifts the green anodes from the floor level and takes them to the top of furnace 10. In another configuration, the green anodes are delivered to the top of furnace 10 with a conveyor. These may be positioned with a crane or dedicated loader for each path.

Figure 4:
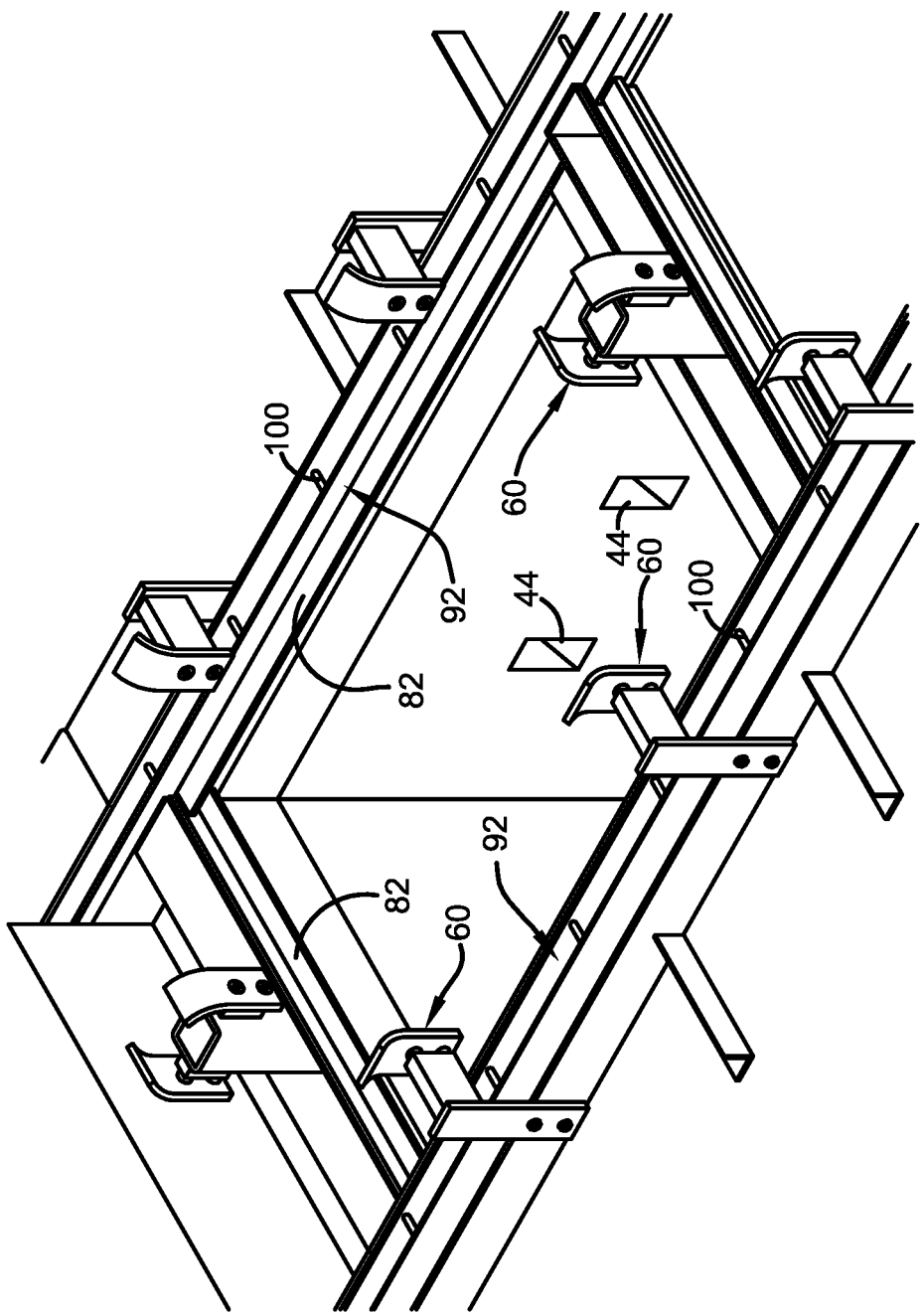
FIG. 4 is a perspective view of the top of a baking path with the anode removed to show the anode guides, the brushes, and the sacrificial medium conveyors. This view also shows openings in the refractory block that define the inlets to the volatile fume removal system.

The next anode 30 is positioned directly on top of the anode column 32 by a plurality of upper guides 60 shown in FIGS. 4 and 5. Upper guides 60 are passive. Each upper guide 60 is mounted on a guide base 70 and includes an arm 72 that is cantilevered from guide base 70. A curved guide foot 74 is carried by the distal end of arm 72 in a position such that the straight bottom of guide foot 74 is substantially vertical and disposed tangential to a portion of the anode column 32. The top of guide foot 74 is curved or angled back toward guide base 70 (away from its anode column 32) so that an anode 30 being lowered through guides 60 will be guided into the correct position by the upper curved portion of guide foot 74 in the situation where anode 30 is not perfectly aligned with anode column 32 by crane 50 or when the dimensions of anode 30 are slightly out of spec. A pair of conical springs 76 are positioned against each other and between guide foot 74 and arm 72 to allow the position of guide foot 74 to automatically adjust. In the exemplary configuration, guide foot 74 is connected to arm 72 with a pair of bolts 78 and conical springs 76 are carried on bolts 78 disposed between arm 72 and guide foot 74.

A flexible seal 80 defined by a plurality of overlapping brushes 82 having metal bristles is positioned at the upper end of each baking path 12. The overlapping portions of brushes 82 at their corners may be notched or cut to accommodate the overlap. Seal 80 engages the perimeter of anode 30 as anode 30 drops down through seal 80. Seal 80 is disposed over the top of the sacrificial medium and limits migration of air into the sacrificial medium.

Figure 9:
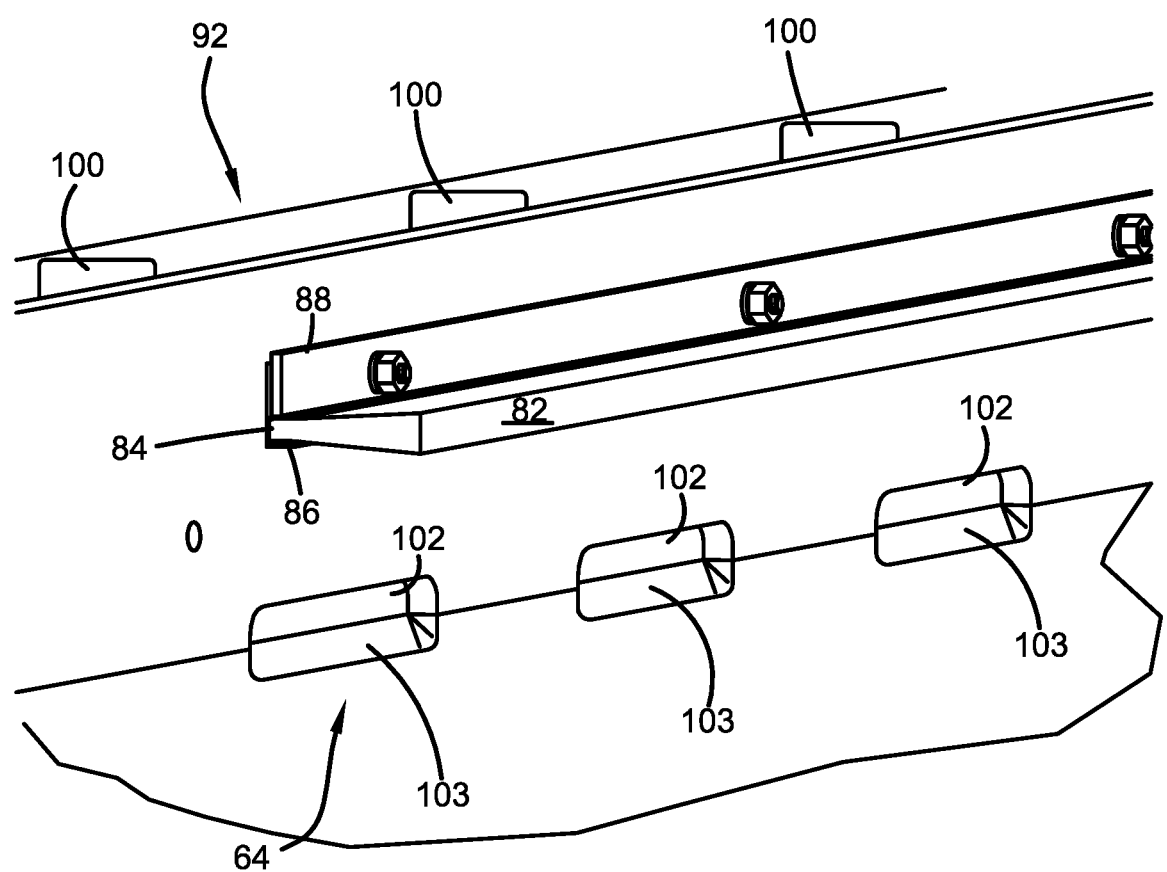
FIG. 9 is a perspective view of the sacrificial medium conveyor of FIGS. 7 and 8 showing the brush and the outlet openings that allow the sacrificial medium to exit the conveyor into the baking path around the anode.

Each section of seal 80 includes a plurality of metal bristles mounted in a U-channel 84 that is clamped between an L-shaped base mount 86 and a mounting strip 88 positioned over U-channel 84. This configuration is depicted in FIGS. 9 and 10.

Furnace 10 includes a sacrificial medium delivery system that generally includes at least one sacrificial medium storage container and at least one sacrificial medium conveying assembly that delivers sacrificial medium from the container to the space around the top of anode column 32. The assembly may be a conveyor or a task provided to crane 50. In the exemplary configuration of furnace 10, one sacrificial medium conveyer assembly 64 is disposed on each side of each row of anodes 30 such that there are six sacrificial medium conveyors 64 in this exemplary configuration. Each of the six sacrificial medium conveyors 64 is fed by a sacrificial medium hopper 90. Each sacrificial medium hopper 90 is filled automatically by a supplier assembly (not shown) or manually by the person overseeing the operation of furnace 10. When crane 50 is used to maintain hopper 90, a container of sacrificial medium is picked up by the crane from time-to-time and moved over hopper 90 wherein an outlet to the container is opened to deliver the medium to hopper 90.

Figure 7:
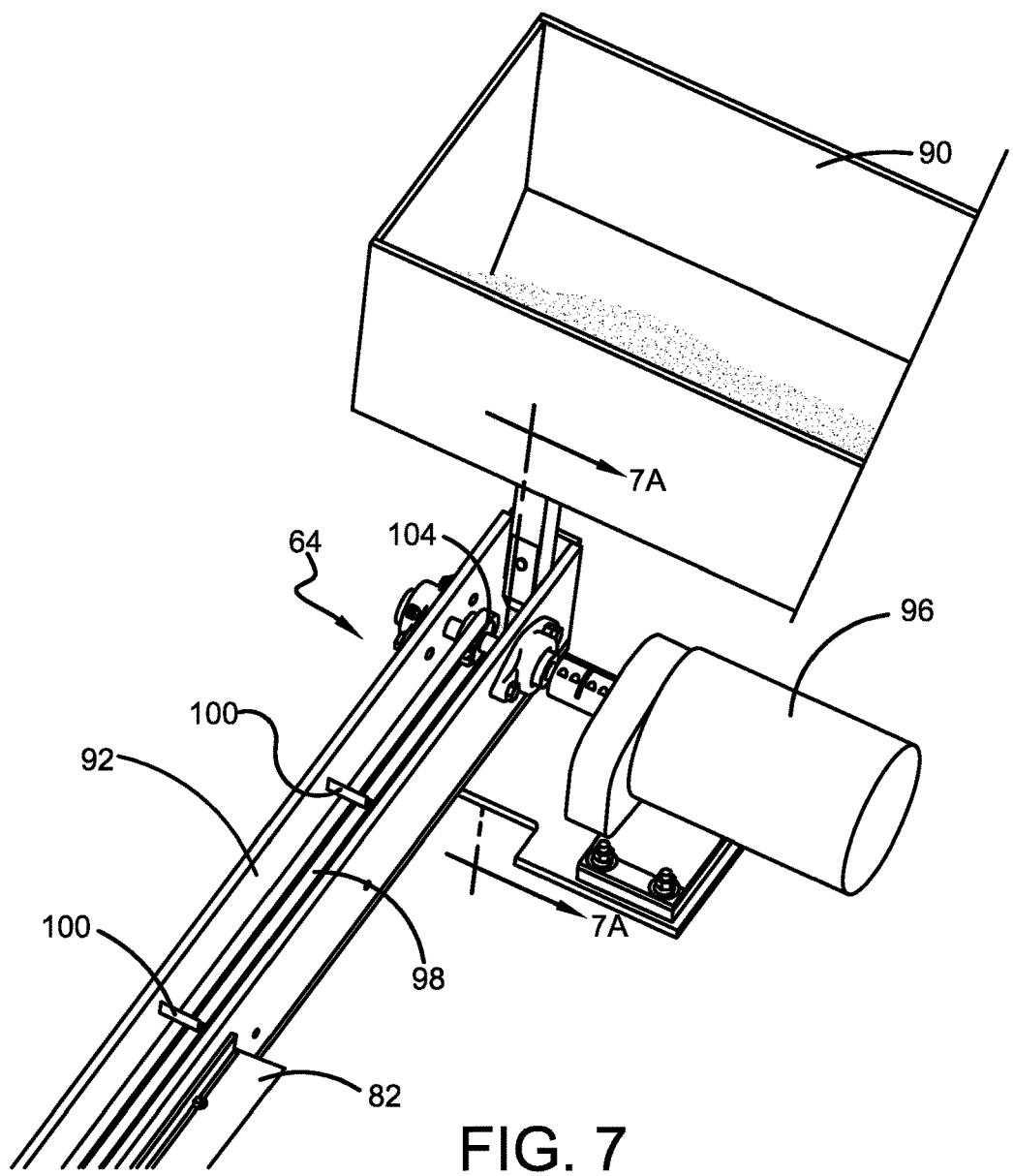
FIG. 7 is a perspective view of the loading end of a sacrificial medium conveyor used to deliver sacrificial medium to the top of the baking path around an anode.
Figure 7A:
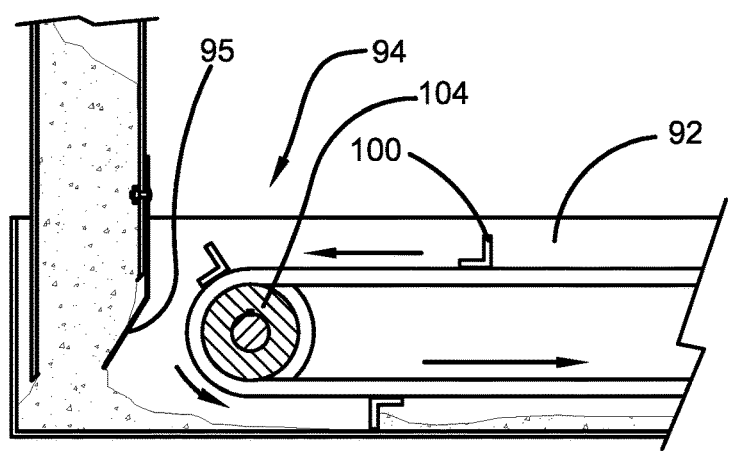
FIG. 7A is a section view taken along line 7A-7A in FIG. 7 showing how the supply of sacrificial medium may be controlled with an adjustable door.

Each sacrificial medium conveyor 64 includes an elongated channel 92 and a sacrificial medium delivery apparatus 94 disposed within channel 92. Delivery apparatus 94 may be the drag chain described herein, a screw conveyor, a vibratory conveyor, or other conveyor used to move granular material along channel 92. The upstream end of channel 92 is loaded with sacrificial medium from hopper 90. The loading of medium from hopper 90 to channel 92 is achieved via gravity and controlled with an adjustable door 95 as shown in FIG. 7A. Door 95 may be moved up and down relative to channel 92 to control the amount of medium delivered to channel 92. When in use, door 95 is open to a height that allows the nature angle of repose of the medium to be engaged by paddles 100 without overflowing channel 92 or burying the upstream drive gear 104. Delivery apparatus 94 moves the sacrificial medium downstream through channel 92. Delivery apparatus 94 includes a motor 96 that drives a belt or chain 98 that carries paddles 100 disposed within channel 92. Paddles 100 push the sacrificial medium in the downstream direction past a plurality of outlets 102 defined by the inner wall of channel 92 disposed adjacent anode column 32. Outlets 102 are disposed under seal 80. In some cases, the inner corners of the brick may be removed to define chutes 103 to help the sacrificial medium flow into paths 12 from channel 92. Outlets 102 may be about 12.5 to 13 mm tall and about 140 to 160 mm long.

Figure 8:
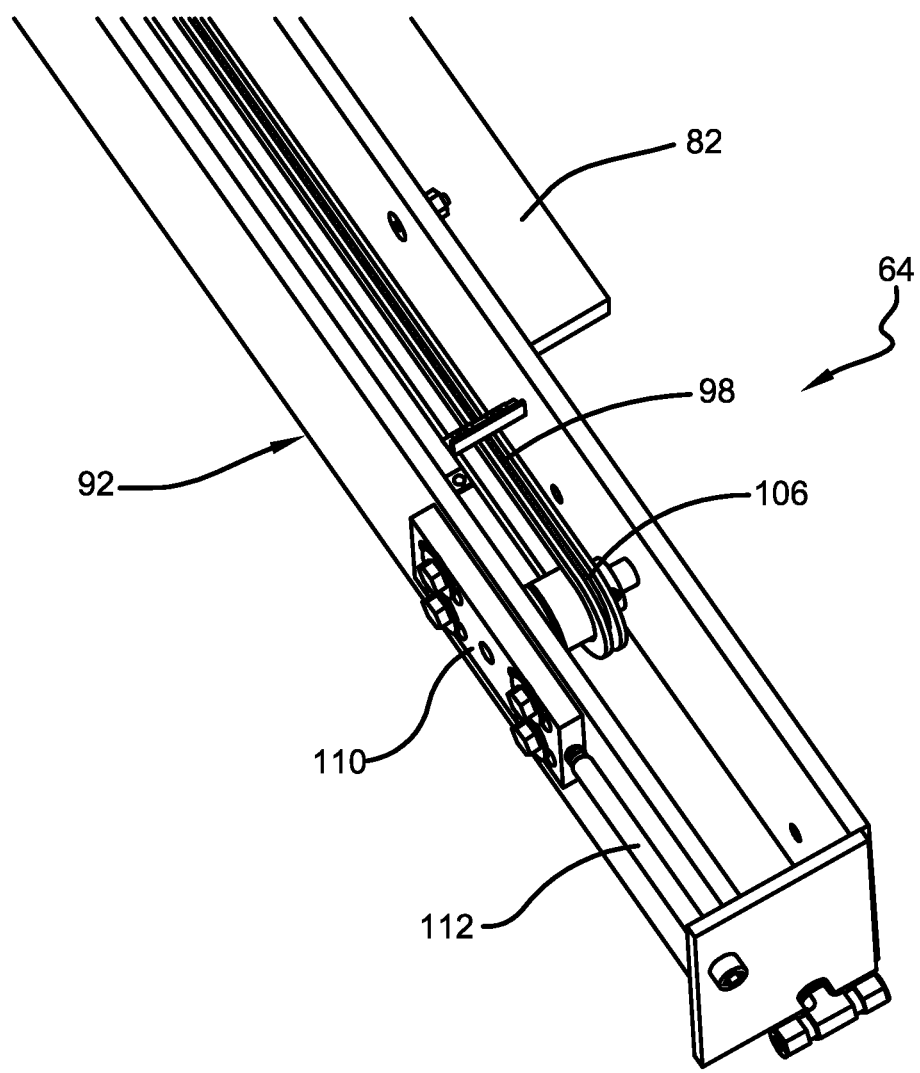
FIG. 8 is a perspective view of the end of the sacrificial medium conveyor of FIG. 7 showing the adjustment mechanism for the drive chain.
Figure 10:
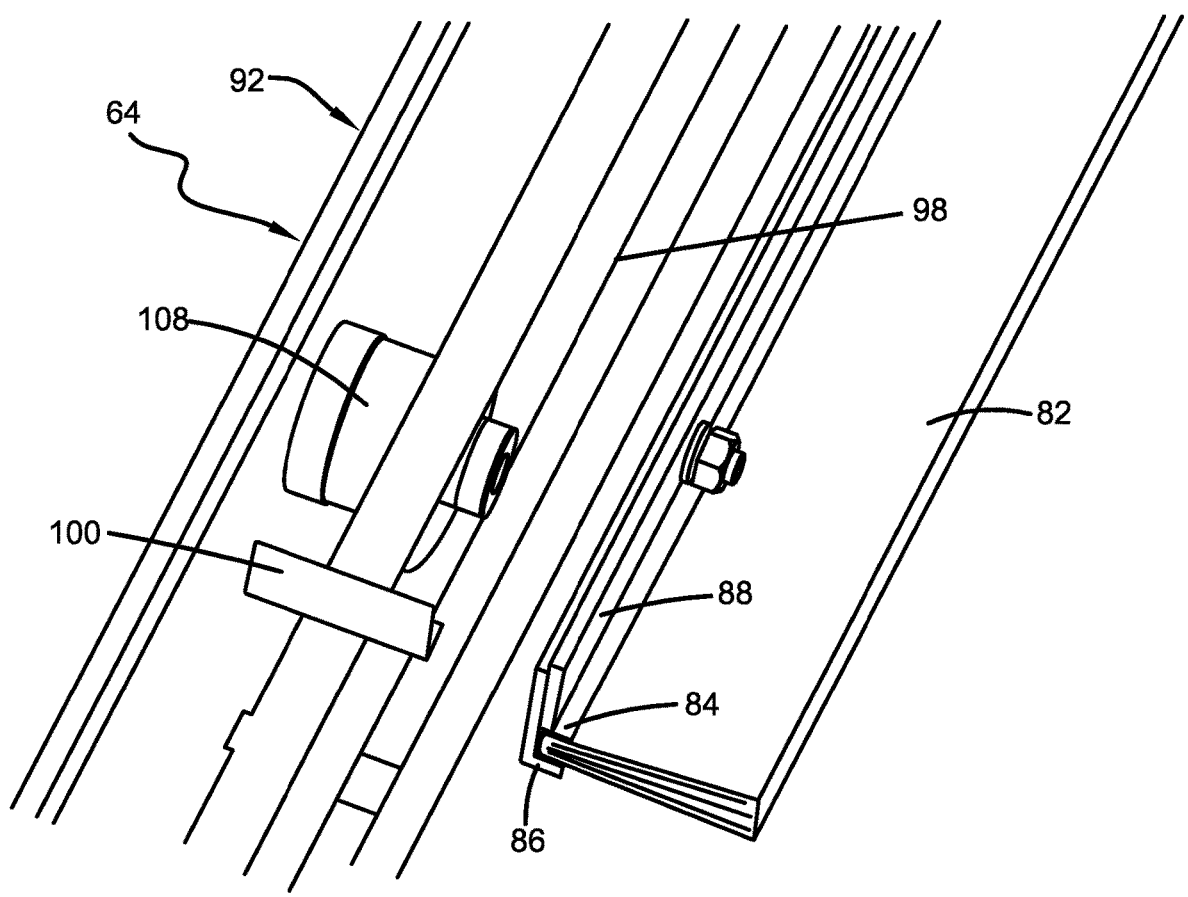
FIG. 10 is a top perspective view of a portion of the sacrificial medium conveyor of FIGS. 7 and 8 showing an idler roller and a paddle that is used to distribute the sacrificial medium along the length of the conveyor.

Belt or chain 98 is supported on a drive gear 104 (FIG. 7), and end idler gear 106 (FIG. 8), and at least one intermediate idler gear 108 (FIG. 10). Additional intermediate idler gears 108 may be provided as needed to avoid belt sag. End idler gear 106 is supported on tension bracket 110 movable by turning tension bolt 112. Paddles 100 are L-shaped sections of metal bolted to belt or chain 98.

Figure 6:
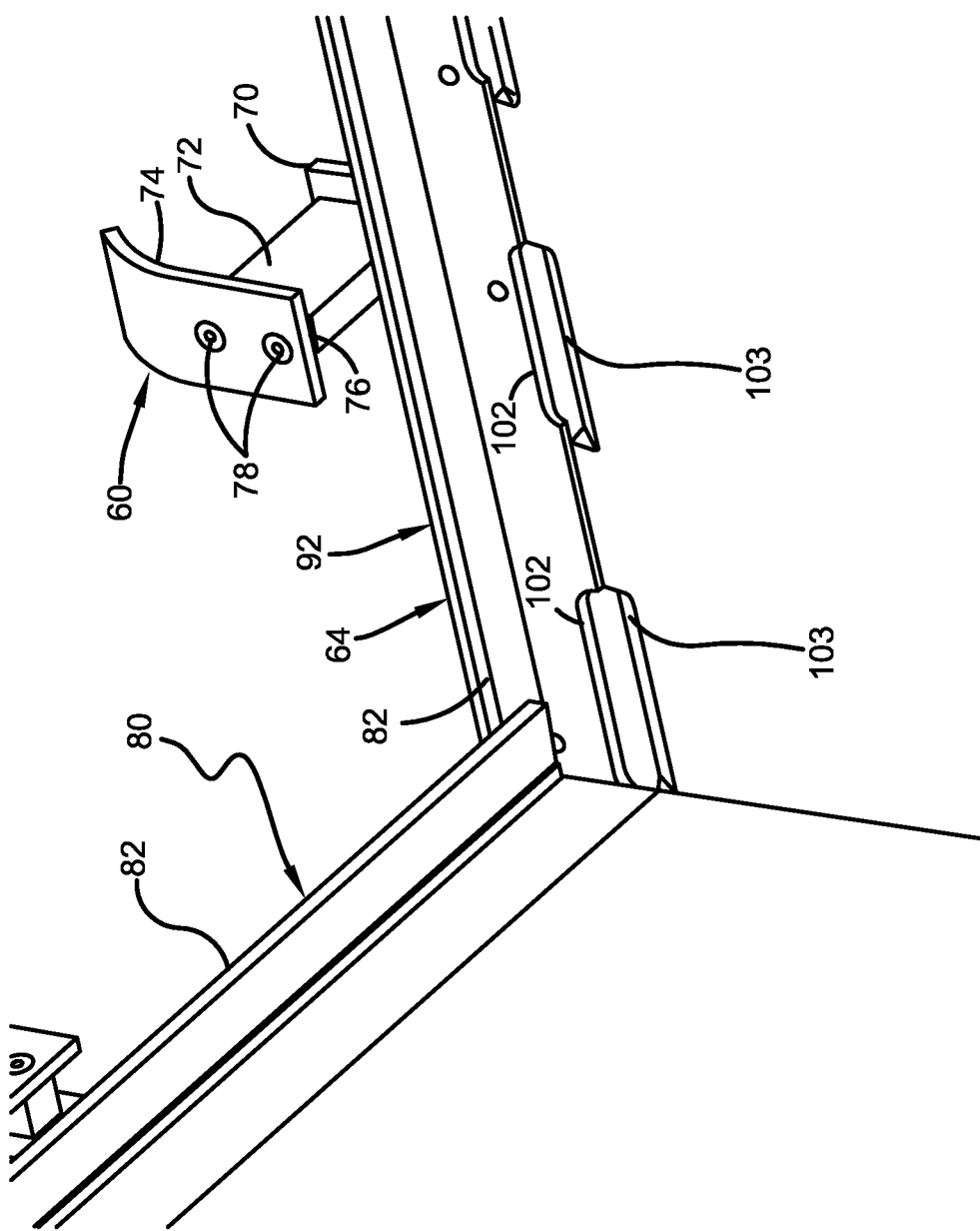
FIG. 6 is a perspective view from inside a baking path looking up to the top of the baking path with the refractory block removed to show the overlapping brushes and the outlets to the sacrificial medium conveyors.

Outlets 102 are elongated and spaced apart. A plurality of outlets 102 have a length that is roughly four or more times as long as the height of outlet 102. The height is large enough to accommodate the largest size of sacrificial medium and the large width minimizes clogged outlets 102 while also allowing for uniform distribution of sacrificial medium along anodes 30. As shown in FIG. 6, an outlet 102 is disposed at the corner of anode 30 so that sacrificial medium is distributed to the ends of anodes 30 where the sacrificial medium fills in the ends by way of gravity at the angle of repose for the sacrificial medium. Openings 102 at corners may be larger than the other openings to promote the distribution of sacrificial medium in these locations.

When assembly 64 is started, the paths 12 closest to hopper 90 receive most of the sacrificial medium. Once the paths 12 are filled and openings 102 are filled with medium, paddles 100 will continue pushing the medium farther downstream until it encounters an opening 102 that can receive the medium. This process continues until the last sidewall of the anode farthest from hopper 90 is covered with medium. Sensors 113 (FIG. 2) are provided to sense this condition and to turn off motors 96 as needed. As the sacrificial medium moves down through the baking paths, the sensors 113 are triggered and signal the actuation of motors 96 to deliver more medium.

The sacrificial medium also may loaded around the anodes 30 with a dispenser that is moved by an overhead crane. One option is using the same crane 50 that loads the anodes. A bin that carries the sacrificial medium may be picked up by crane 50 after crane 50 has placed an anode. The bin includes a valved outlet sized to dispense sacrificial medium in the baking paths 12 around anodes 30. In one configuration, the outlet may be sized to fit entirely around the anode perimeter so that the crane merely needs to locate the bin above the anode and open the valve to fill the entire space around the anode with sacrificial medium. In another configuration, the nozzle is sized to be as long as or longer than the longer side of the anode so the entire side can be filled with one opening of the valve. In another configuration, the outlet is a small tube and the crane moves the outlet around the perimeter of the anode while dispensing the sacrificial medium.

In another configuration of furnace 10, bins 90 of sacrificial medium may be located along the sides of the anode columns. The bins have outlets that allow the sacrificial medium stored in the bins to flow into the space around the anode. The outlets may be controlled with valves or adjustment plates to control the flow of the packing material. These bins may be reloaded manually, with a dedicated conveyor, or with a crane.

Nitrogen gas may be introduced into channels 92 such that the nitrogen will migrate down into sacrificial medium around anodes 30. Flooding the sacrificial medium with nitrogen limits the amount of oxygen surrounding anode column 32 and thus limits reactions within the sacrificial medium. A fire suppression system also may be integrated into or just below channels 92 to flood the areas around the anode column with a fire suppressant. The nitrogen and the fire suppression system may be disposed below brushes 82.

The sacrificial medium moves down through baking path 12 with anodes 30 and accommodates the movement and size changes of anodes 30 during the baking process. The sacrificial medium may move at a rate that is different from anodes 30. The sacrificial medium may be moved faster than the anodes 30 which accommodates the relatively free movement of the anode stack down the baking path regardless of any expansion and contraction of individual anodes 30.

Figure 13:
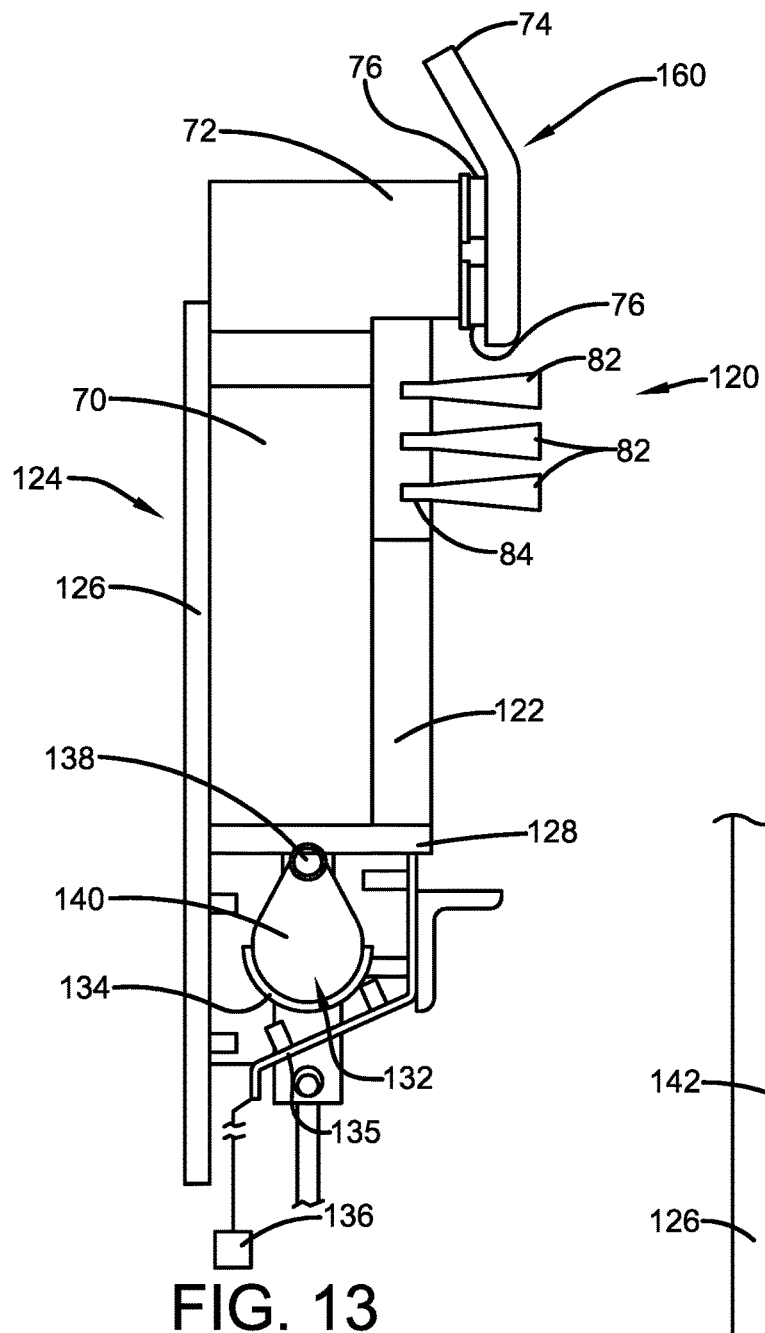
FIG. 13 is an end view of an exemplary sacrificial medium control assembly that is disposed at the bottom of the baking path.
Figure 14:
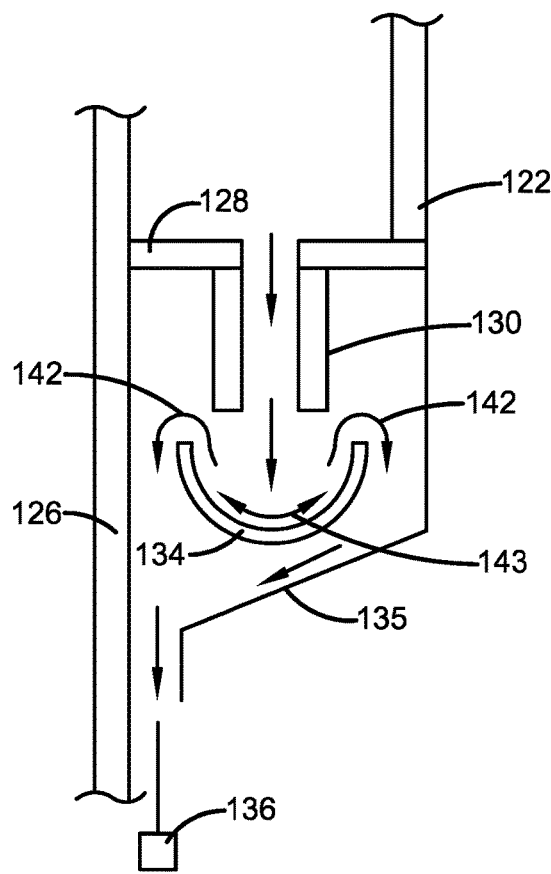
FIG. 14 is a schematic cross section of the sacrificial medium control assembly showing the movement of the sacrificial medium with schematic arrows.
Figure 15:
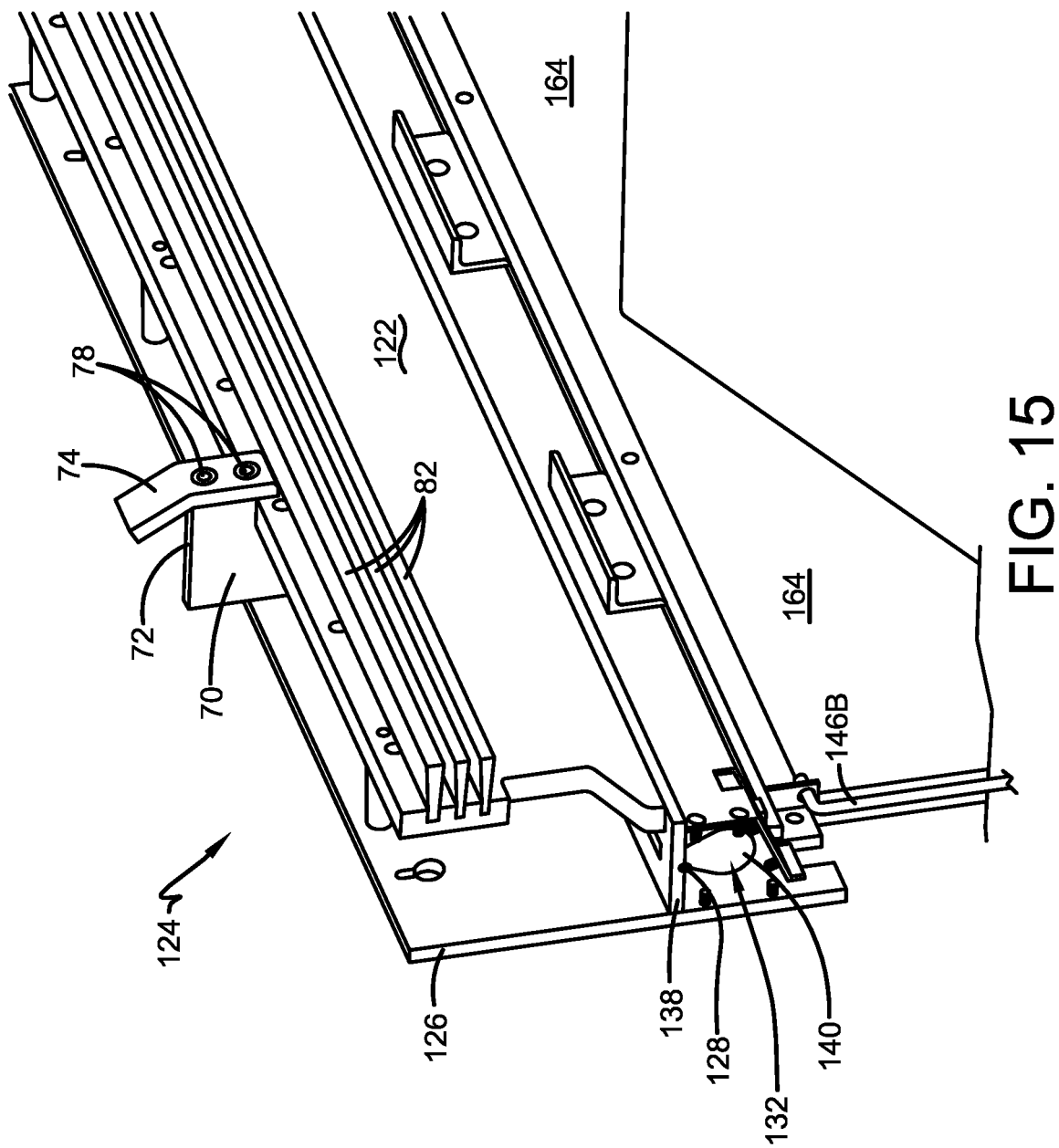
FIG. 15 is a perspective view of the end of the assembly shown in FIG. 14 with the anode removed for clarity.

A lower seal 120 shown in FIGS. 13, 14, and 15 supports the sacrificial medium and also limits migration of air into the bottom of the baking paths 12 through the sacrificial medium. Lower seal 120 is similar to upper seal 80 in that it includes overlapped brushes 82 with metal bristles. In the exemplary configuration, a plurality of stacked brushes 82 are used to form seal 120. The ends of the brush bristles are clamped in a U-channel 84 that is received directly in a slot defined by an inner wall 122 of a sacrificial medium removal channel 124. One removal channel 124 is disposed along each side of each baking path 12 to control the movement of medium through the baking paths 12.

The sacrificial medium is stopped by lower seal 120 and is moved over inner wall 122 into channel 124 between inner wall 122, an outer wall 126, and a bottom wall 128 which define the upper portion of channel 124. Bottom wall 128 of channel 124 defines openings (FIGS. 14 and 15) which allow the sacrificial medium to drop down into an elongated inlet 130 to a sacrificial medium control mechanism 132 which functions as an intermediate channel portion of removal channel 124. Mechanism 132 controls the movement of sacrificial medium by removing the sacrificial medium only as needed by automatically removing the sacrificial medium from the top of a control channel 134. The top of control channel 134 is positioned above the bottom of elongated inlet 130 such that sacrificial medium must move upwardly before dropping onto an angled wall 135 of a lower gathering channel portion of removal channel 124. The gathered sacrificial medium is then removed to by way of a chute assembly 136 into a collection hopper or is removed by chute assembly 136 to a conveyor that delivers sacrificial medium back to hoppers 90.

Control channel 134 catches the sacrificial medium and prevents it from simply falling out of furnace 10 by changing the flow direction of the sacrificial medium. In order to control the movement, control channel 134 rocks back and forth on a pivot 138 about which its end panels 140 are mounted. The rocking movement pushes the top portions of the sacrificial medium resting in control channel 134 over its edges into the gathering channel portion below. The material is pushed by the lower portions of elongated inlet 130 as channel 134 rocks back and forth as indicated by reference arrow 143 in FIG. 14. The other arrows 142 in FIG. 14 depict the movement of the sacrificial medium.

Control channel 134 is driven back and forth by a drive mechanism 144 that includes a motor 145 and a push rod 146A which is connected to each of control channels 134 by linking rods 146B. Linking rods 146B are connected to tabs that extend through wall 135 as shown in FIGS. 13 and 15. Drive mechanism 144 moves rod 146B back and forth to rock each of control channels 134 to which it is connected. Faster movement of rod 146B results in faster movement of the sacrificial medium through furnace 10. In the exemplary configuration, drive mechanism 144 includes motors 145 that drive rods 146A back and forth below the metal beams that support refractory body 40. A slot 148 may be defined in lower support 46 to accommodate rod 146A (see FIG. 16). Drive rod extensions 146B are connected to drive rod 146A and to channel 134 (or to tabs that extend down from channel 134 as shown in FIG. 13). Drive rod extensions 146B transfer to movement of drive rod 146A to control channel 134. Channels 134 may be rocked with their own individual actuators. Piston cylinders may be used to move rod 146A or to directly rock channel 134 back and forth.

Intermediate guides 160 are disposed above seal 120 to ensure anode column 32 is properly positioned for removal from furnace 10. Intermediate guides 160 have a similar structure as upper guides 60 and the same reference numerals are used to identify these elements of guides 160. The arms 72 of intermediate guides 160 extend down into sacrificial medium removal channel 124 and may abut bottom wall 128 of channel 124.

Figure 16:
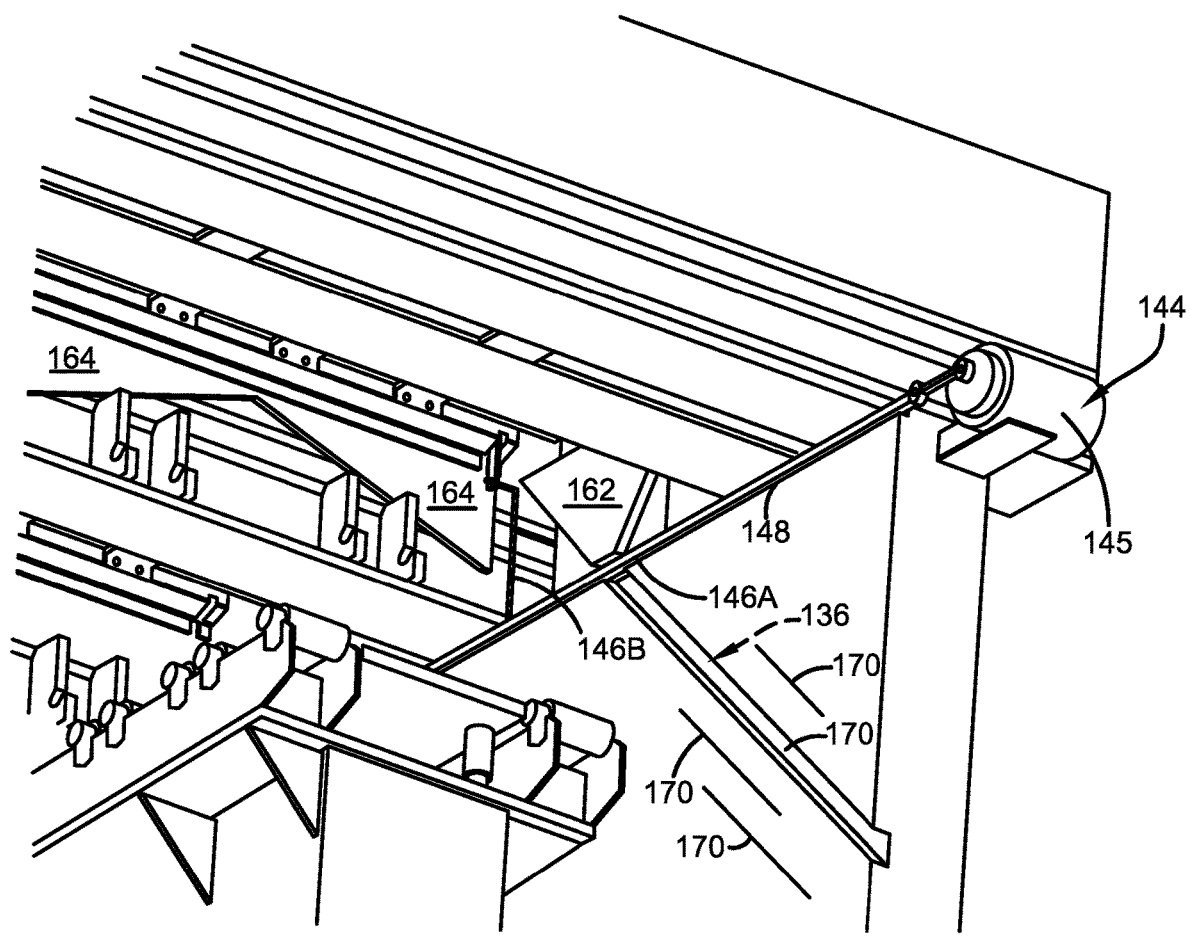
FIG. 16 is a perspective view looking up into the bottom of an anode baking path showing the location of the structure of FIG. 15 and also showing a typical actuation mechanism for the sacrificial medium control assembly.

Chute assembly 136 moves the sacrificial medium out of furnace 10 to a location where it can be screened and recycled. Chute assembly 136 includes a plurality of funnels 162 and 164 disposed around the perimeter of each baking path 12. The longer sides of each baking path 12 use a pair of funnels 164 that direct collected medium towards the corners of the baking path 12. The shorter sides use funnels 162 that direct collected medium to the middle of the baking path 12. There are thus six outlets for each baking path 12. The sacrificial medium exiting channels 124 drops into a funnel 162 or 164 which directs the medium to channels 170 (see FIG. 16) that allow sacrificial medium to slide down and out of furnace 10 where it is gathered to be used again. Channels 170 may be embedded into the furnace supports as shown in FIG. 16 or may be disposed alongside the supports. Channels 170 may be closed or open-top. FIG. 16 does not depict grabs 190 but instead shows the supports for shafts 192. Also, FIG. 16 does not show the chutes that connect funnels 162 and 164 to channels 170. For example, a bypass chute delivers sacrificial medium from funnel 162 beside or around drive rod 146A and into channel 170.

Lower guides 180 are disposed below seal 120 and position anode 30 to be held by the holding mechanism that supports anode column 32 in place while the lowermost anode 30 is removed from furnace 10. Lower guides 180 have a similar structure as upper guides 60 and the same reference numerals are used to identify these elements of guides 180.

Figure 20:
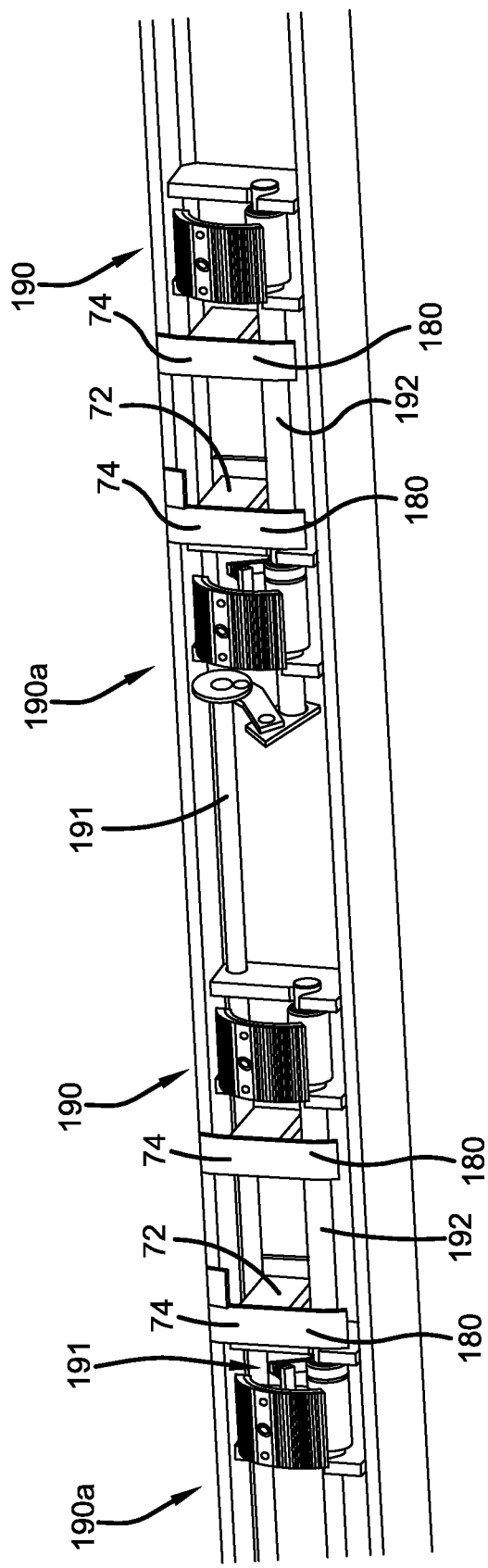
FIG. 20 is a perspective view looking up at one side of the bottom of two adjacent baking paths showing the holding devices that are used to support the anode column while the lowermost baked anode is removed from the furnace.
Figure 21:
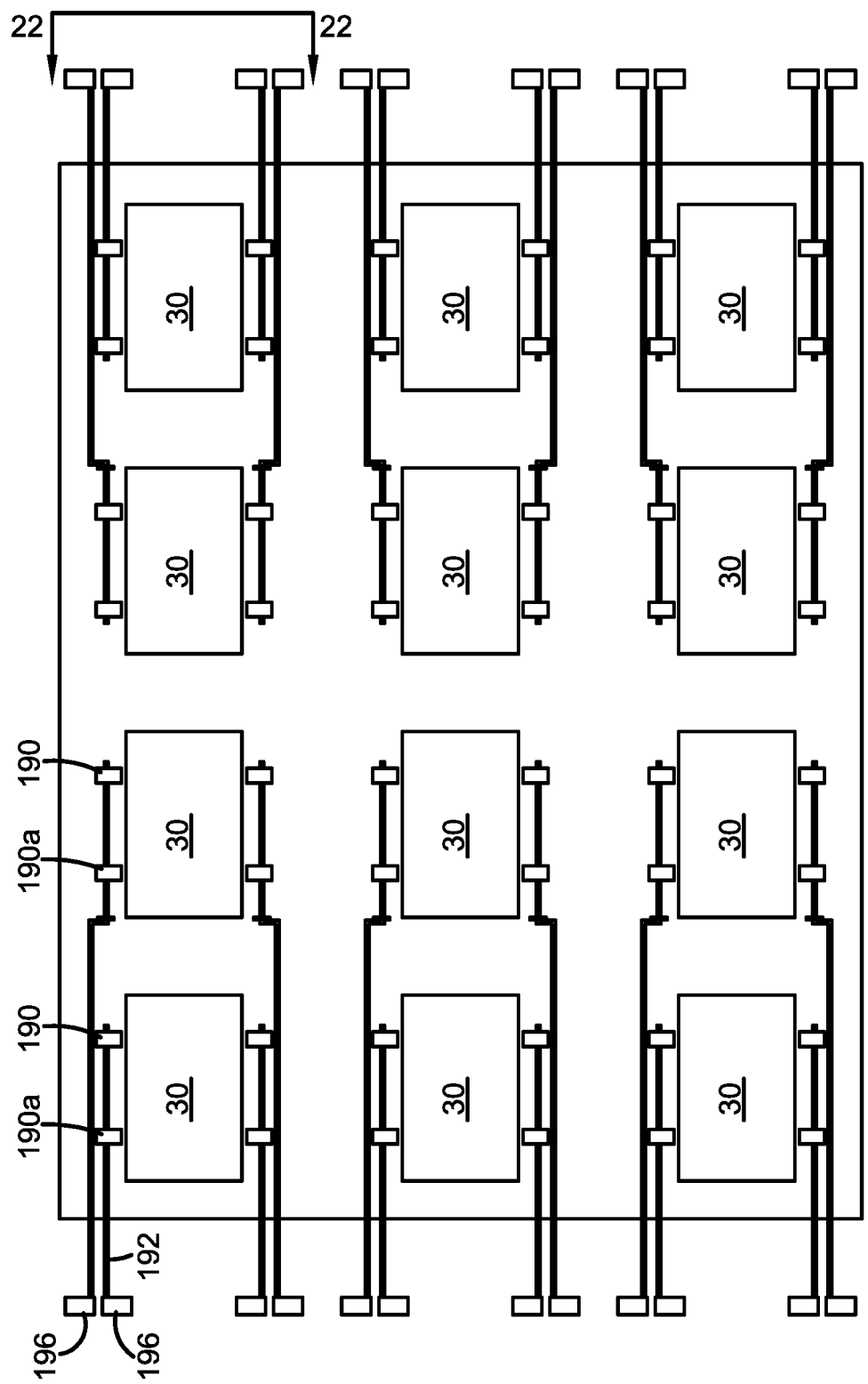
FIG. 21 is a schematic view showing an exemplary configuration for the holding devices and the actuators for the holding devices.
Figure 22:
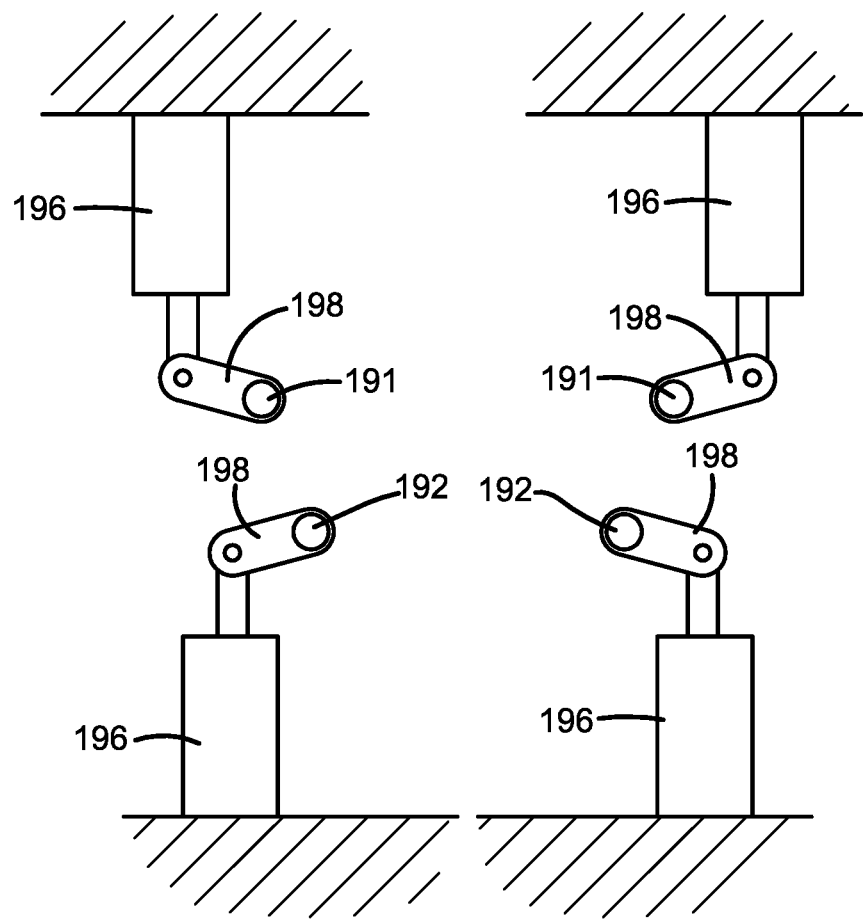
FIG. 22 depicts actuators for the holding devices that hold the anode column during the unloading of an anode.
Figure 23:
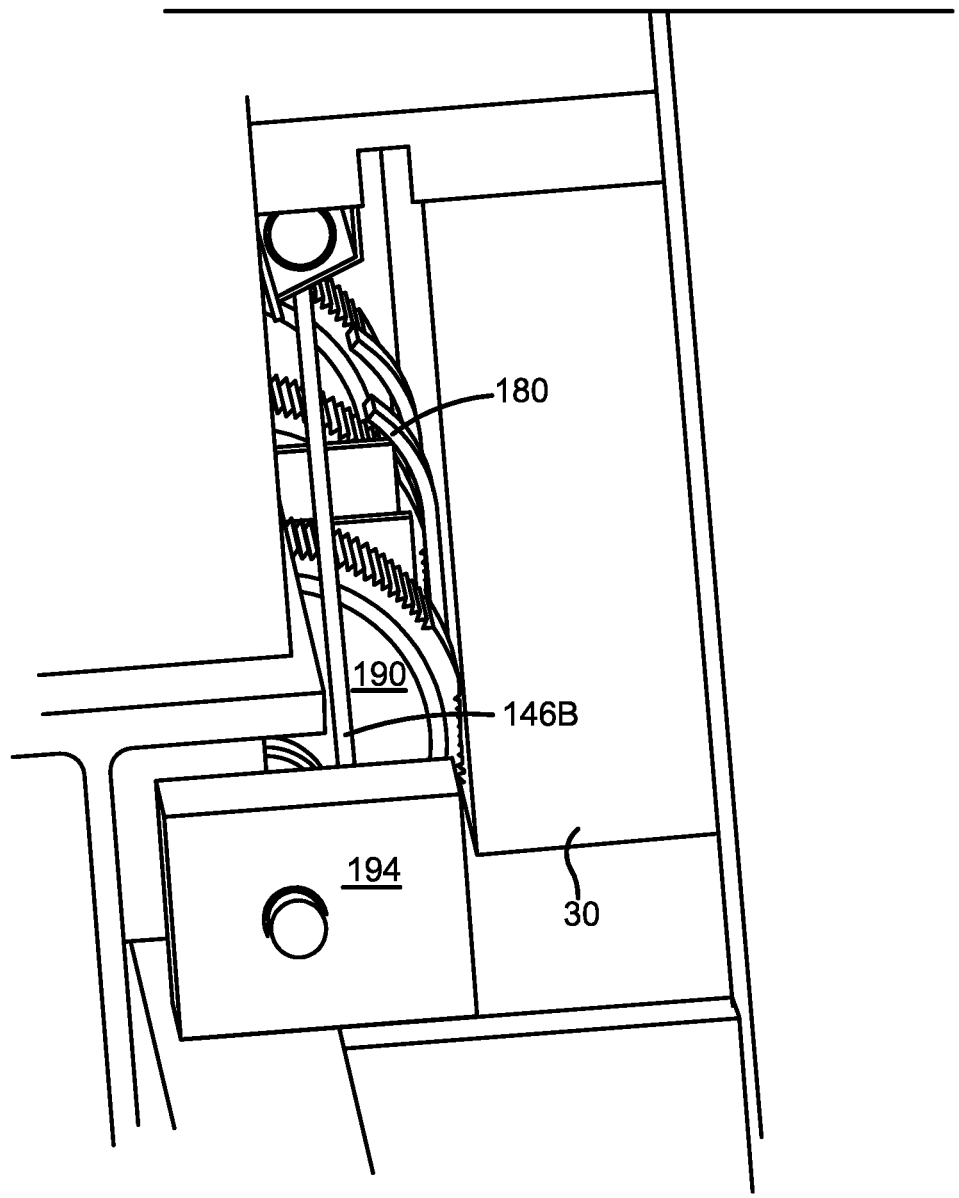
FIG. 23 is a side perspective view showing the holding devices of FIG. 20 engaged with an anode while the lowermost baked anode is removed and also depicting an alternative actuator for the holding devices.
Figure 24:
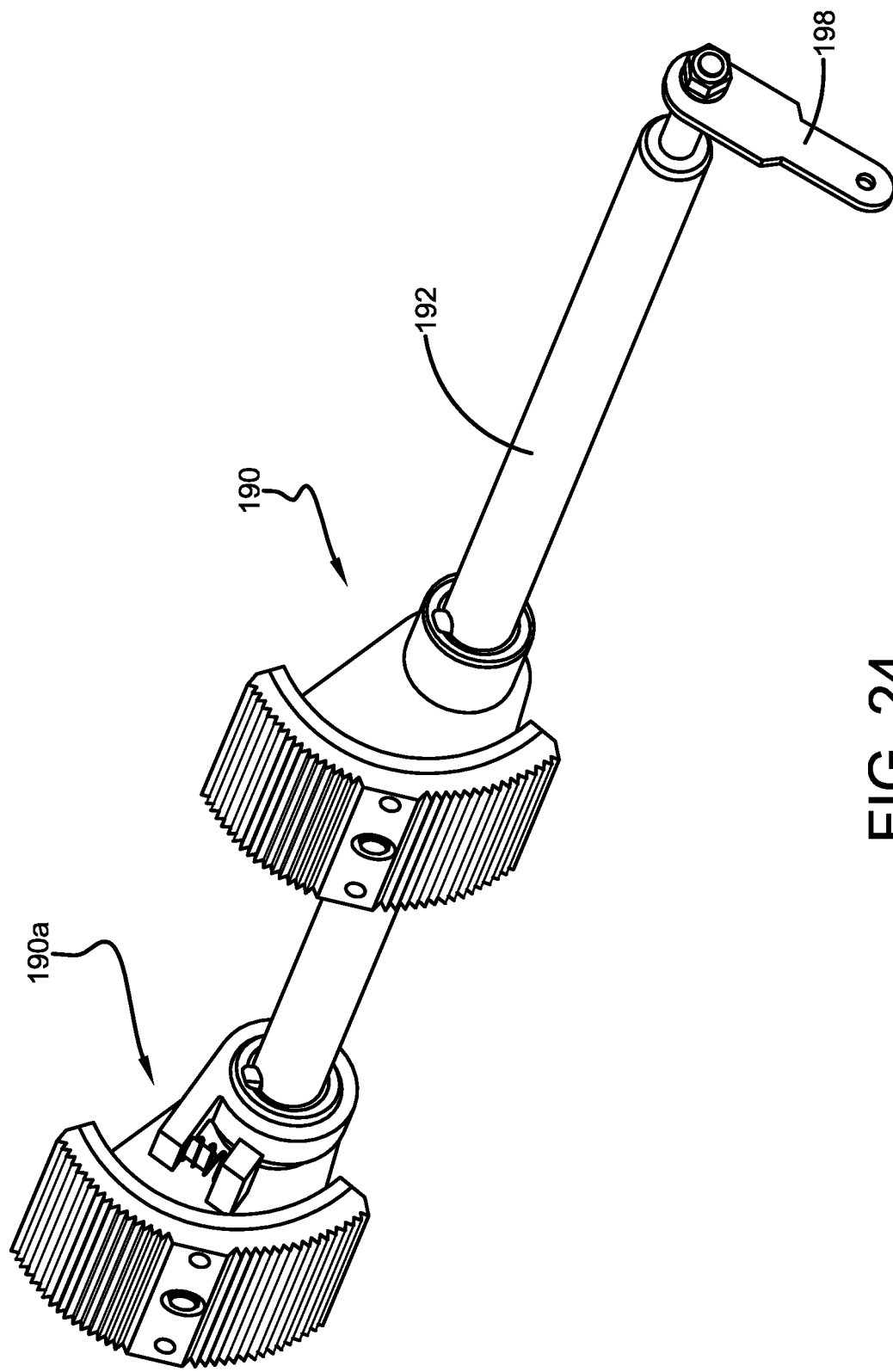
FIG. 24 depicts a pair of holding devices disposed on a common drive shaft.

The holding mechanism includes a plurality grabs 190 which may be curved, toothed holding grabs 190 that pivot downwardly and inwardly into opposite sides of the second lowest anode to hold the anode column. The lowest (or first lowest) anode is supported by the screw jack 200 as described below. In the exemplary configuration, two grabs 190 are disposed on each side of baking path 12 such that four grabs 190 engage the second lowest anode when the holding mechanism is moved to its engaged position or its engaged configuration. Each grab 190 is mounted to a drive shaft 192 that is rotated back and forth between engaged and disengaged positions by a drive mechanism. As shown in FIG. 21, the holding mechanisms disposed at the inner portion of furnace 10 are connected to their drive mechanisms with bypass drive shafts 191 that extend behind the grab support structures and are thus offset from shafts 192 (FIG. 20). In one configuration (FIG. 22), shafts 191 and 192 are driven by piston cylinders 196 connected to links 198. In another configuration (FIG. 23), an actuator motor and gearbox 194 is used to drive grabs 190 between the engaged and disengaged positions. These arrangements allow both the inner and outer grabs 190 to be controlled from the outer ends of the furnace by extending shafts 191 and 192 out to the furnace ends and locating the drive mechanisms in these locations.

When the lowermost anode 30 is ready to be removed from column 32, the drive mechanisms are actuated to move opposed pairs of grabs 190 into engagement with the second lowermost anode 30. As the lowermost anode 30 is moved down, the second lowermost anode 30 starts moving down under the weight of column 32 causing grabs 190 to continue pivoting downwardly and inwardly which causes them to bite into the side of that anode 30 until grabs 190 lock and prevent downward movement of the anode column 32. Column 32 thus stops moving and the lowermost anode 30 is removed as described below.

Figure 25:
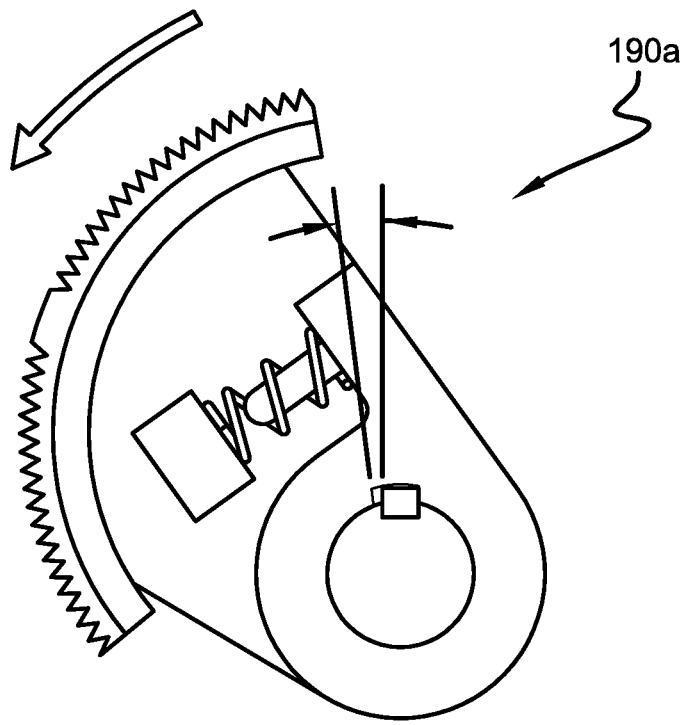
FIGS. 25 and 26 show two positions for an accommodating holder device.
Figure 26:
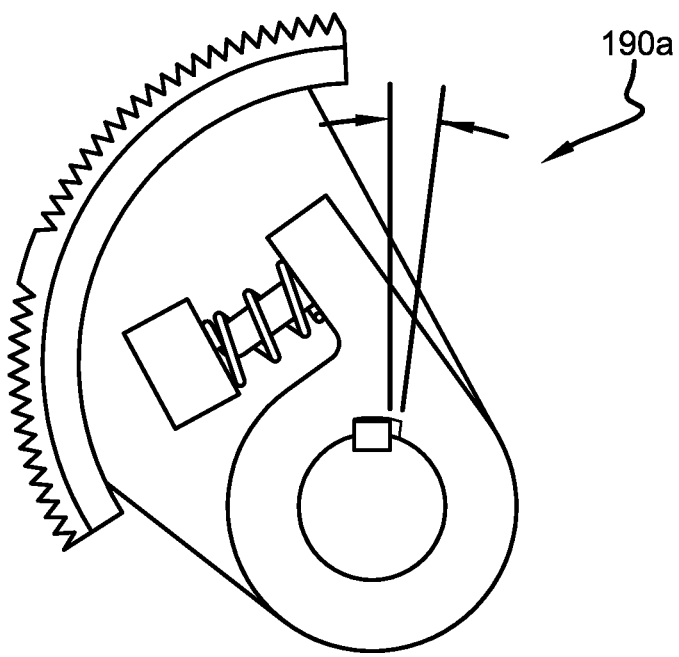

To facilitate anodes 30 that are not perfectly square to grabs 190, at least one grab 190 on each side of baking path 12 is an accommodating grab 190*a* (FIGS. 25 and 26) that adjusts its position when it initially engages the side of the anode 30. The accommodating grab 190*a* can adjust its position through an adjustment angle of about five to ten degrees which allows the lateral position of the grab teeth to engage an anode sidewall through a range of about four to eight millimeters. Accommodating grab 190*a* includes a spring that forces the grab toward the anode. Accommodating grab 190*a* can thus engage the side of the anode 30 through a range of anode positions. Accommodating grabs 190*a* may be disposed directly across from each other or at angles to one another across the anode 30. With two grabs 190*a*, the total accommodation is in the range of eight to sixteen millimeters.

Figure 17:
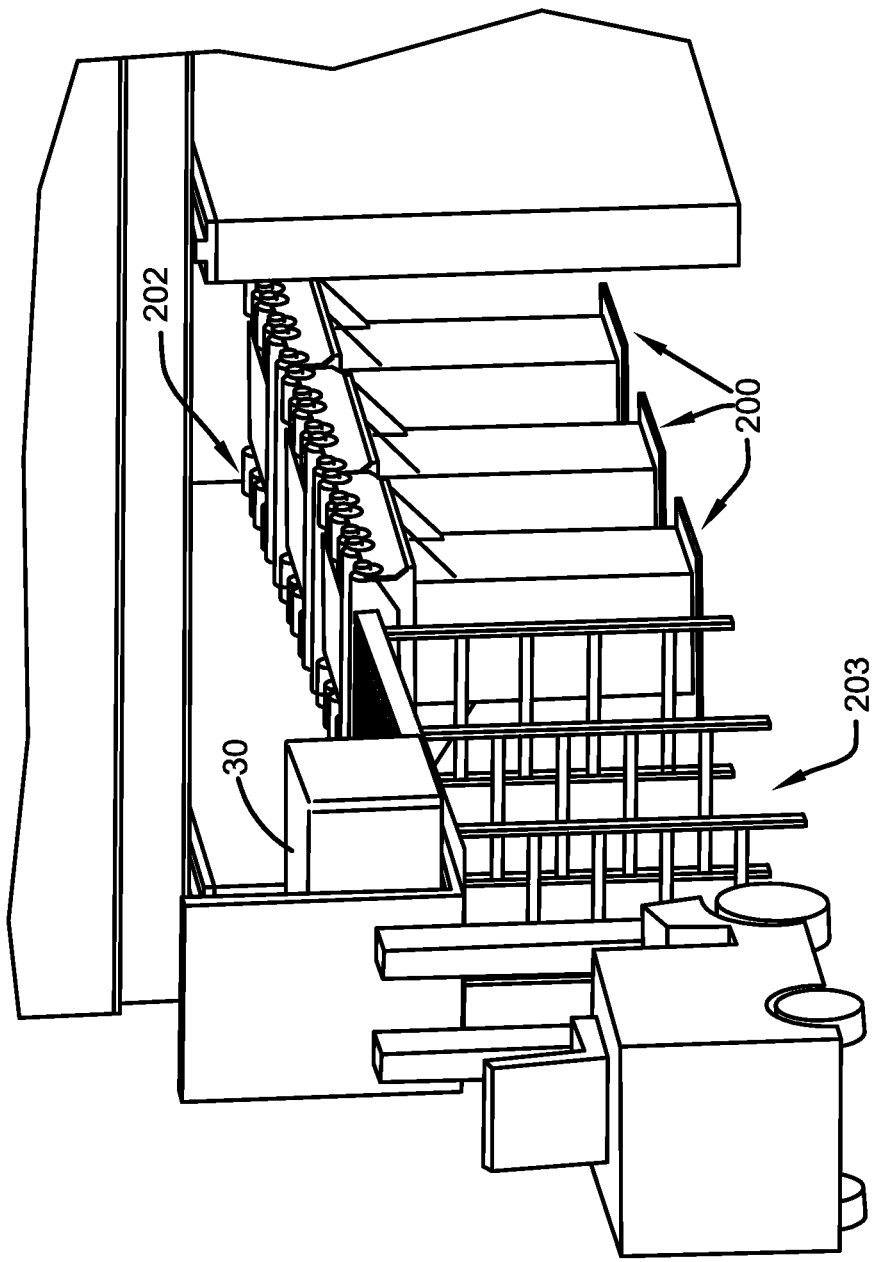
FIG. 17 is a perspective view of a portion of an exemplary conveyor used to move baked anodes out from under the furnace after the baked anode has been removed from the baking path.

The downward movement of anode column 32 is controlled by an anode column unloading device disposed under the anode column. The unloading device is provided in the form of a screw jack 200 positioned directly under column 32 in the exemplary configuration of furnace 10. Screw jack 200 is configured to move slowly such as when it is being used to drop anode column 32 down along baking path 12 during the baking of anodes 30. Screw jack 200 can also move relatively fast such as when it is removing the lowermost anode 30 from furnace 10. Screw jack 200 maintains its slow movement until grabs 190 are holding column 32. Screw jack 200 then changes to its faster movement and lower the lowermost anode 30 down to a gravity powered passive conveyor 202 which removes the anode to a removal area 203 (FIG. 17) where a forklift can remove the baked anodes. An advantage of using a screw jack is that it holds its position during a power interruption. Other devices such as hydraulic lifts may be used.

Figure 29:
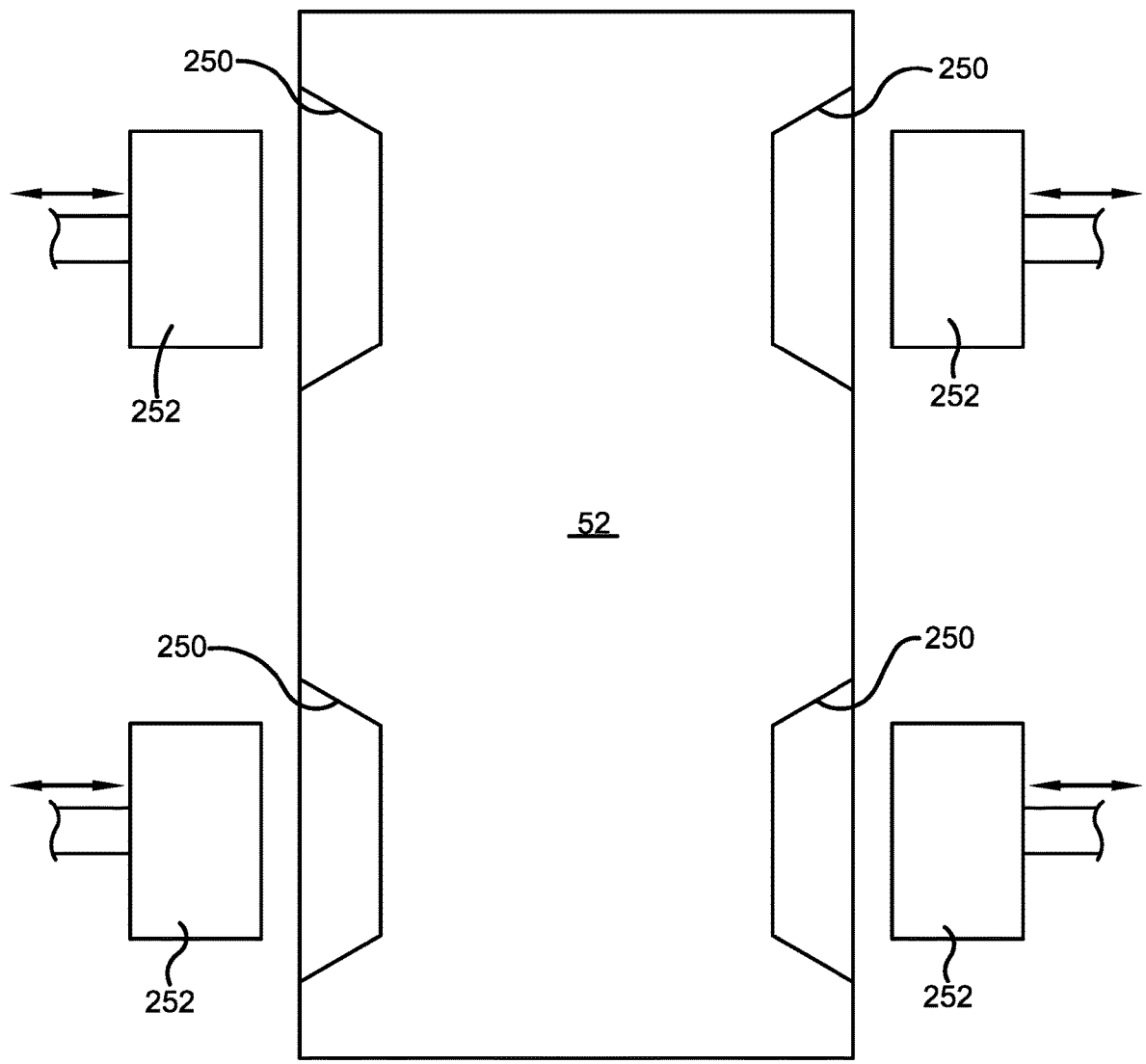
FIG. 29 is a top view of an alternative anode spacer disposed on top of an anode.

Another system for holding the anode column is shown in FIG. 29 wherein the spacer 52 defines notches 250 which allow holding fingers 252 to be driven between spaced anodes 30 when spacer 52 is aligned with fingers 252. Fingers 252 may be drive linearly back and forth with actuators or they may pivot into notches 250. When fingers 252 are disposed under the anode stack, the lowermost anode can be lowered to the conveyor 202 while the anode stack remains held in place. A further configuration for holding column 32 is to use holding plates that press into the side of the second lowermost anode. The plates may be driven with hydraulic pressure.

During this process, the anode 30 from the front row 14 of the baking path array is removed first and the screw jack 200 remains retracted down under the conveyor 202 until the anodes from the middle 16 row is removed and, following the same process, the anode from the back row 18 is removed. In an alternate configuration, the back row anode may be removed from the back of the furnace. This process allows the anodes from the middle and back rows to slide down conveyors 202 without being stopped by the jack screws for the front row of anodes. After anodes 30 are removed from all rows 14, 16, and 18, screw jacks 200 are extended back up to engage columns 32. In order to break the grip of grabs 190, screw jacks 200 lift column 32 up until grabs 190 release or are driven back to their disengaged positions by actuators 196 or 252. At that time, screw jack 200 starts moving column 32 downward again until the new lowermost anode 30 is ready for removal.

This process may be reserved to initially load furnace 10. If loaded from the bottom, screw jack 200 lifts an anode 30 to grabs 190 where it is held until pushed up by the next anode 30 being loaded.

Figure 18:
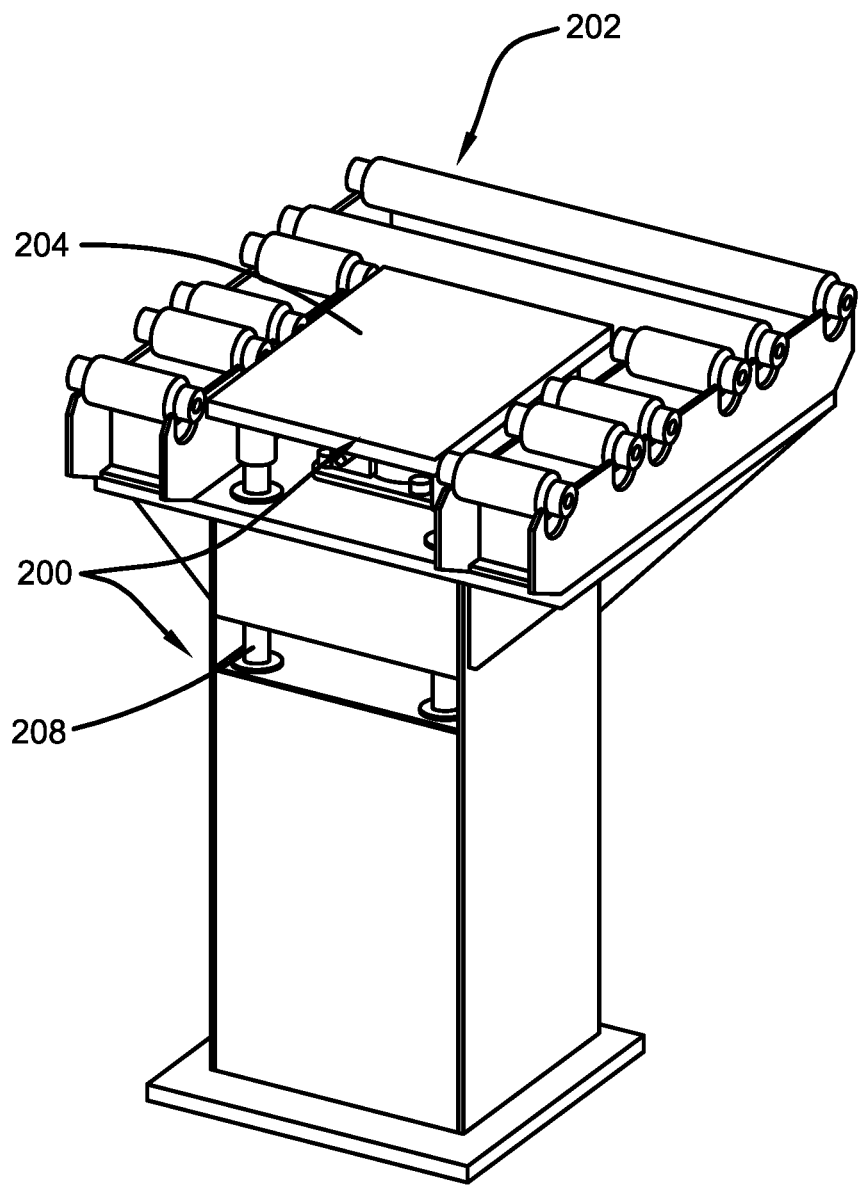
FIG. 18 is a perspective view of a mechanism that unloads the lowermost baked anode and controls the movement of an anode column through the baking path.
Figure 19:
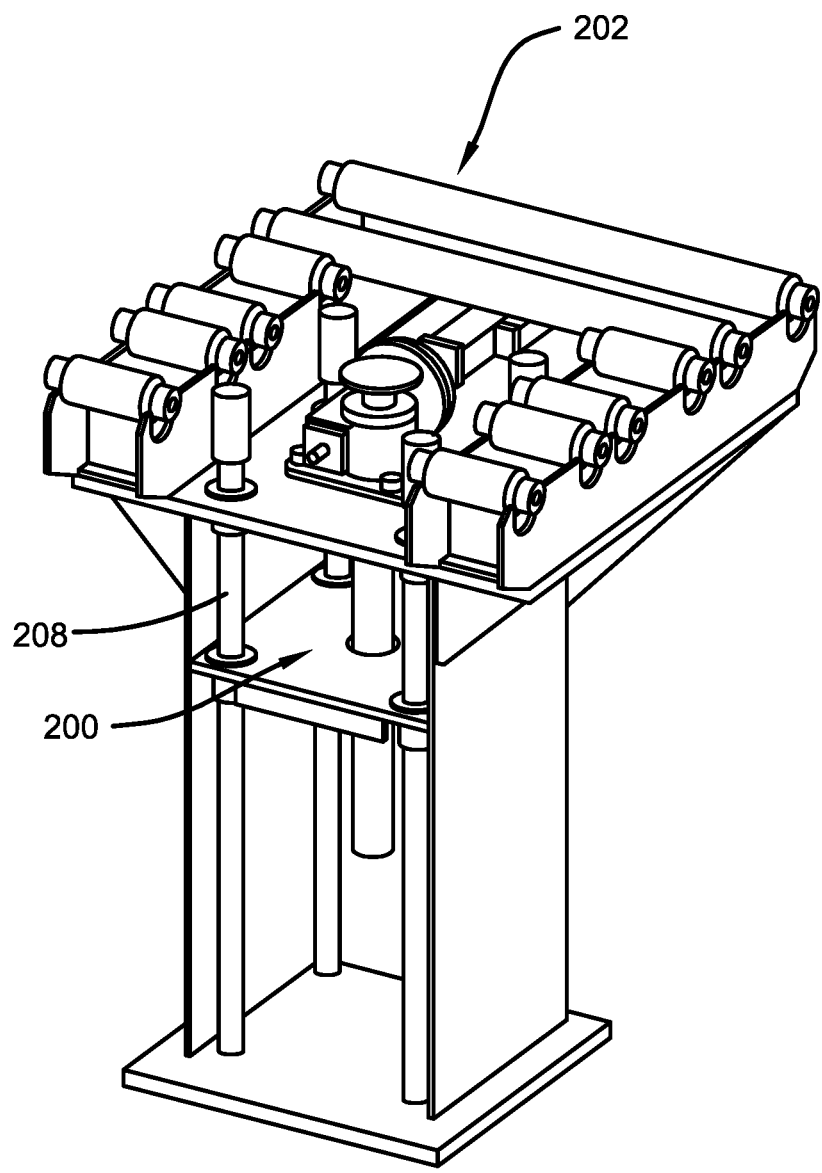
FIG. 19 is a perspective view of the mechanism of FIG. 18 with portions removed to show additional features.

As shown in FIGS. 18 and 19, screw jack 200 extends through the center of conveyor 202. An engagement plate 204 is carried at the top of screw jack 200 to engage anode 30. Plate 204 is supported at five locations including the powered central screw 206 and four corner guides 208.

Figure 27:
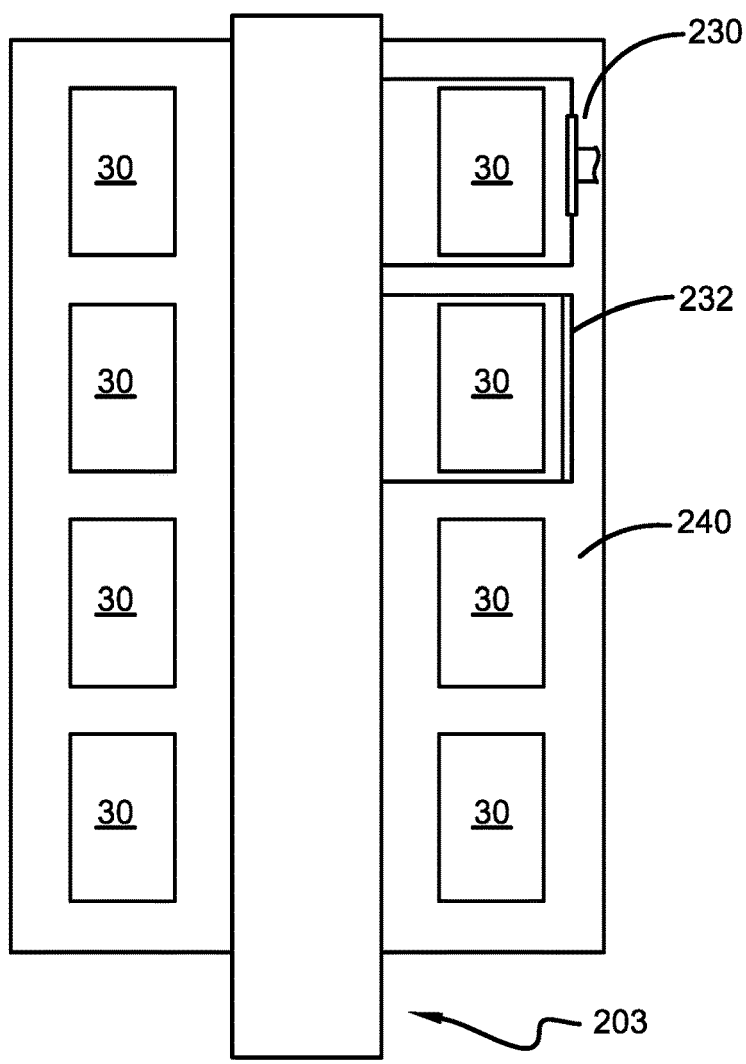
FIG. 27 is a top schematic view of an alternative conveyor configuration for unloading anodes.
Figure 28:
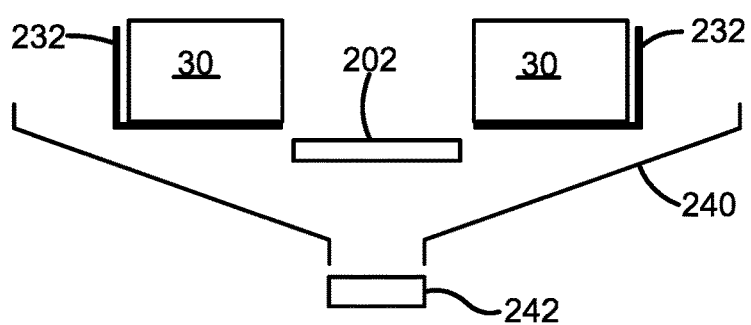
FIG. 28 is an end view of FIG. 27.

An alternative conveyor 202 is depicted in FIGS. 27 and 28 wherein conveyor 202 is disposed between anodes 30 such that the anodes are lower to positions beside conveyor 202. Once the baked anode 30 is lowered down to the level of conveyor 202, an actuator 230 or 232 pushes or tilts the baked anode 30 onto conveyor 202. Actuator 230 pushes anode 30 directly onto conveyor 202 and actuator 232 tilts up and tips anode 30 onto conveyor 202 or allows it to slide via gravity.

FIGS. 27 and 28 also show an alternative embodiment for removing the sacrificial medium from the bottom of furnace 10. In this configuration, the sacrificial medium is caught by a chute 240 that delivers the sacrificial medium to a conveyor 242 disposed under conveyor 202.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the furnace is an example and the furnace is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A vertical path carbon baking furnace for baking green carbon articles; the furnace comprising:
   a refractory material furnace body defining a substantially vertical baking path adapted to receive the green carbon articles; the vertical baking path having a volatile extraction zone disposed above a baking zone;
   the refractory material furnace body defining a volatile extraction inlet in communication with the substantially vertical baking path; the volatile extraction inlet being disposed in the volatile extraction zone of the baking path;
   a liner carried within the refractory material furnace body; the liner being hollow to define a liner channel in fluid communication with the volatile extraction inlet;
   the refractory material furnace body defining serpentine baking fume channels disposed on opposite sides of the baking path to receive baking fumes; each of the serpentine baking fume channels being spaced outwardly from the substantially vertical baking path by portions of the refractory material furnace body; portions of the serpentine baking fume channels being disposed within the volatile extraction zone;
   each of the serpentine baking paths having substantially parallel runs within the volatile extraction zone; the refractory material furnace body defining at least one volatile extraction channel sandwiched between portions of the substantially parallel runs of each baking fume channel; the liner being carried by the refractory material furnace body within the at least one volatile extraction channel;
   a burner that provides baking fumes to the baking fume channels; and
   the volatile extraction inlet in fluid communication with the burner through the liner channel such that volatile fumes extracted from the baking path through the volatile extraction inlet and the liner channel can be selectively delivered to the burner for combustion.

2. The carbon baking furnace of claim 1, wherein the liner is removably carried within the refractory material furnace body.

3. The carbon baking furnace claim 1 wherein the refractory material furnace body defines guides projecting into the at least one volatile extraction channel for locating the liner; the at least one volatile extraction channel having a length and the guides being spaced along the length of the channel.

4. The carbon baking furnace of claim 1, wherein the liner defines an opening aligned with the volatile extraction inlet.

5. The carbon baking furnace of claim 1, wherein the green carbon articles are carbon anodes used for the production of aluminum.

6. The carbon baking furnace of claim 1, wherein the refractory material furnace body defines a plurality of substantially vertical baking paths adapted to receive the green carbon articles; each of the vertical baking paths having a volatile extraction zone disposed above a baking zone;
   the refractory material furnace body defining a plurality of volatile extraction inlets in communication with the substantially vertical baking paths; the volatile extraction inlets being disposed in the volatile extraction zones of the baking paths; and
   the liner being in fluid communication with the plurality of the volatile extraction inlets.

7. The carbon baking furnace of claim 6, wherein the refractory material furnace body includes a sidewall that defines a portion of the at least one volatile extraction channel; the sidewall being disposed between the plurality of vertical baking paths and the at least one volatile extraction channel; the sidewall defining the volatile extraction inlets.

8. The carbon baking furnace of claim 7, further comprising a guide disposed in the at least one volatile extraction channel; the liner being disposed between the guide and the sidewall that defines the volatile extraction inlets.

9. The furnace of claim 1, wherein the liner is disposed above the volatile extraction inlet.

10. The carbon baking furnace of claim 1, wherein each of the serpentine baking paths has at least first and second substantially parallel runs at the volatile extraction zone; the at least one volatile extraction channel being defined between the first and second substantially parallel runs.

11. The carbon baking furnace of claim 1, wherein each of the serpentine baking paths has at least first, second, third, and fourth substantially parallel runs at the volatile extraction zone; a volatile extraction channel of the at least one volatile extraction channel being defined between the first and second substantially parallel runs and between the third and fourth substantially parallel runs.

12. The carbon baking furnace of claim 1, wherein each of the serpentine baking paths has at least first, second, third, fourth, fifth, and sixth substantially parallel runs at the volatile extraction zone; a volatile extraction channel of the at least one volatile extraction channel being defined between the first and second substantially parallel runs, between the third and fourth substantially parallel runs, and between the fifth and sixth substantially parallel runs.

* * * * *